US011497973B1

(12) United States Patent
DeMille et al.

(10) Patent No.: US 11,497,973 B1
(45) Date of Patent: Nov. 15, 2022

(54) ADDITIVE MANUFACTURING METHODS FOR GOLF PRODUCTS

(71) Applicant: Callaway Golf Company, Carlsbad, CA (US)

(72) Inventors: Brandon D. DeMille, Carlsbad, CA (US); Eric Stubben, Encinitas, CA (US); David R. Handy, Encinitas, CA (US); Irina Ivanova, San Marcos, CA (US); Patrick Dawson, Poway, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 0 days.

(21) Appl. No.: 17/362,638

(22) Filed: Jun. 29, 2021

Related U.S. Application Data

(60) Provisional application No. 63/208,327, filed on Jun. 8, 2021, provisional application No. 63/166,028, filed on Mar. 25, 2021.

(51) Int. Cl.
| | | |
|---|---|---|
| *A63B 53/14* | (2015.01) | |
| *A63B 53/04* | (2015.01) | |
| *A63B 60/08* | (2015.01) | |
| *B33Y 80/00* | (2015.01) | |
| *A63B 60/54* | (2015.01) | |
| *A63B 53/10* | (2015.01) | |
| *A63B 37/02* | (2006.01) | |
| *A63B 37/00* | (2006.01) | |

(52) U.S. Cl.
CPC .......... *A63B 53/0487* (2013.01); *A63B 53/14* (2013.01); *A63B 60/08* (2015.10); *A63B 60/54* (2015.10); *B33Y 80/00* (2014.12); *A63B 37/0003* (2013.01); *A63B 53/0416* (2020.08); *A63B 2209/02* (2013.01)

(58) Field of Classification Search
CPC ............ A63B 53/0466; A63B 53/0487; A63B 53/0406
USPC .................................................. 473/324–350
See application file for complete search history.

(56) References Cited

U.S. PATENT DOCUMENTS

| | | | | |
|---|---|---|---|---|
| 4,747,599 | A | * 5/1988 | Antonious | ......... A63B 53/0487 473/341 |
| 5,401,021 | A | 3/1995 | Allen | |

(Continued)

FOREIGN PATENT DOCUMENTS

| | | | | |
|---|---|---|---|---|
| WO | WO-2014144824 | A1 * | 9/2014 | ............. A63B 53/00 |
| WO | WO-2022056496 | A1 * | 3/2022 | ......... A63B 53/0412 |

OTHER PUBLICATIONS

Non-Final Office Action dated Sep. 16, 2021, regarding U.S. Appl. No. 17/327,483, filed May 21, 2021.

(Continued)

*Primary Examiner* — Alvin A Hunter
(74) *Attorney, Agent, or Firm* — Rebecca Hanovice; Michael A. Catania; Sonia Lari

(57) ABSTRACT

Methods of creating golf products with complex structures that would be difficult, impossible, or cost prohibitive to produce, such as lattice structures, beam structures, and complex surface-based structures, and golf products that are created using those methods, are described herein. The structures described herein may be made from metal, non-metal materials, or combinations thereof, and may have one or more portions that are made from transparent or translucent materials.

11 Claims, 33 Drawing Sheets

(56) References Cited

U.S. PATENT DOCUMENTS

| | | | |
|---|---|---|---|
| 10,343,301 B2 | 7/2019 | Day | |
| 10,695,617 B1* | 6/2020 | Madson | A63B 37/08 |
| 11,331,544 B1* | 5/2022 | DeMille | A63B 53/0416 |
| 2007/0243950 A1 | 10/2007 | Billings | |
| 2012/0178550 A1 | 7/2012 | Solheim | |
| 2013/0072321 A1* | 3/2013 | Morales | B23K 20/233 |
| | | | 228/159 |
| 2013/0337932 A1 | 12/2013 | Kammerer | |
| 2014/0135144 A1* | 5/2014 | Morales | A63B 53/0466 |
| | | | 228/178 |
| 2014/0274458 A1* | 9/2014 | Kronenberg | A63B 60/46 |
| | | | 700/106 |
| 2014/0274459 A1* | 9/2014 | Kronenberg | A63B 53/04 |
| | | | 473/345 |
| 2016/0263449 A1* | 9/2016 | Morales | B23K 20/021 |
| 2019/0091895 A1 | 3/2019 | Knappworst | |
| 2019/0231018 A1 | 8/2019 | Boutin | |
| 2020/0171753 A1 | 6/2020 | Satco | |
| 2022/0080270 A1* | 3/2022 | Brubaker | A63B 53/0475 |

OTHER PUBLICATIONS

Non-Final Office Action dated Mar. 22, 2022 regarding U.S. Appl. No. 17/327,502, filed May 21, 2021.
Final Office Action dated Jul. 20, 2022 regarding U.S. Appl. No. 17/327,502, filed May 21, 2021.

* cited by examiner

ADDITIVE MANUFACTURING METHODS FOR GOLF PRODUCTS

CROSS REFERENCES TO RELATED APPLICATIONS

The present application claims priority to U.S. Provisional Application No. 63/208,327, filed on Jun. 8, 2021, and to U.S. Provisional Application No. 63/166,028, filed on Mar. 25, 2021, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to methods of manufacturing golf-related products with complex structures that are difficult, impossible, or cost prohibitive to produce via prior art methods, such as cell-based lattice patterns, beam-based structures, and complex surface-based structures, and golf products, including golf club components, golf club heads, golf balls, and golf grips manufactured to include such patterns and/or structures.

Description of the Related Art

Traditional manufacturing processes, which include investment casting, injection molding, compression molding, metal injection molding, forging, stamping, and forming place many constraints on the design of golf club heads and club head components, preventing manufacturers from fully customizing and optimizing their products. Some of these constraints include draw direction, taper, minimum wall thickness, draft angles, minimum radii, and maximum feature height.

Typical additive manufacturing techniques, also known as 3D printing, can eliminate or reduce the severity of these constraints, but have their own drawbacks. For example, direct metal laser sintering (DMLS), direct metal laser melting (DMLM), and electron beam additive manufacturing (EBAM) use controlled energy sources, including lasers and electron beams in which intense, extremely localized heat is applied to metal powder to melt and/or sinter adjacent particles together. This intense heat tends to cause warping, porosity (which creates inconsistent density throughout the part), distortion, surface defects, and even cracking of the parts during the build process, even when the laser intensity, focal length, and path speed are optimal.

Other characteristics of these techniques include using very small moving points to build parts, provide limited solutions for removing excess powder from the finished part, require significant post-processing to remove supports and support footprints on the surface, and require a very specific grade of metal powder (e.g., smaller than 40 microns, spherical particles) for high resolution and to guarantee an even sintering and a relatively smooth surface finish. These characteristics render these techniques suboptimal and cost-prohibitive for golf club manufacturing purposes.

The most significant drawback of the DMLS and DMLM techniques is the constraint they place on overhang angle, examples of which are shown in FIG. 41. As golf club parts are built, structures created by the prior art additive manufacturing techniques described above are not self-supporting, with thin beads of sintered material tending to sag and fall if they are not supported by connections to the build plate or another portion of the part that has already been fully sintered. As a result, a typical design requirement is that all surfaces be no more than 45° from the build axis, but the limit is typically 30-60°. The only alternative to the overhang angle design requirement is to add supports to the structure to help prevent sagging during the build process. The supports used for DMLS, DMLM, and EBAM are metal and are directly connected to the part, and are difficult to remove without negatively affecting the surface finish on the part or creating a large opening in the club head.

The overhang angle constraint dramatically limits the potential of otherwise promising designs that are based on modern generative design techniques like topology optimization. It also severely limits the types, orientations and sizes of cells that can be manufactured to form lattices. Even when a designer settles on a cell type that satisfies the overhang constraint, there is often no room for further optimization of the lattice via purposeful warping, skewing or otherwise stretching portions of the lattice to generate an improved design. It is also impractical to use metal supports to make fine lattice structures feasible to manufacture. If a lattice were to include overhanging beams and the beams are supported, the supports would be impossible to remove.

As described above, the prior art does not provide additive manufacturing techniques that are optimized for creation of golf club components. Therefore, there is a need for 3D printing methods that create high quality, high performing golf-related products.

BRIEF SUMMARY OF THE INVENTION

One aspect of the present invention is a method of manufacturing a golf ball, golf club head, golf club component, or golf grip comprising cell-based lattice patterns, beam-based structures, and/or complex surface-based structures using additive manufacturing processes, which may incorporate optimization software to prepare at least one model of the end product.

Another aspect of the present invention is a golf ball, golf club shaft, golf club grip, golf club head, or golf club component comprising a lattice structure or a complex surface based structure. In some embodiments, the lattice structure or complex surface based structure is a component that is affixed to another component having higher density weighting in optimal positions for improved mass properties. The lattice or complex surface based structure may be co-molded or overmolded with another material.

Yet another aspect of the present invention is a golf ball with a lattice layer composed of a first material and a fill within the lattice that is composed of a second material having a different density or material properties than the first material.

Another aspect of the present invention is a golf club grip incorporating a lattice structure, the hardness of said grip varies dependent on a player's hand placement and pressure gradient. Such grips may deform to contour to a player's hands.

Yet another aspect of the present invention is a golf club insert with lattice structures that allow for variable flexibility and adaptive dampening (acoustic control) of the insert, which may be a face insert, a crown insert, or a sole insert or "puck." The lattice structures fine tune the behavior of the insert and do not "activate" unless a sufficient load, or off-axis load, is placed on the insert. They may also modulate the response based on the location of impact or incident angle. In some embodiments, the lattice structures, which may be formed using additive technologies, improve ball speed and spin robustness, and the gaps between lattice beams may be filled with a material having a different density or material properties than the lattice material.

In some embodiments, the insert may be a face insert with crown and sole extensions that are affixed to the body so that they are visible to a user at address or in a golf bag. In further embodiments, the lattice may be a continuously variable mesh which allows the manufacturer to tightly control properties in each location within the insert—for example, the motion of the face-ball interface, speed, and spin—and thereby fine-tune vertical and heel-toe motion in a face insert.

Yet another aspect of the present invention is a product comprising a first lattice structure and a second lattice structure, each of which is printed separately from distinct materials and having distinct properties, which are then interlocked.

In other embodiments described herein, one or more of the lattice structure, enveloping surfaces, and the filler material may be transparent or translucent so that one or more portions of the product are at least partially visible to a player.

In any of the embodiments described herein, the golf ball, golf club component, or golf club head may be electroplated, which improves stiffness and aesthetics of the part.

In any of the embodiments described herein, the golf product may be manufactured by photocuring a liquid resin system layer by layer via projector or laser.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention is directed to improved methods of printing golf club components and golf club heads, such as binder jetting, stereolithography (SLA), digital light synthesis (DLS), digital light processing (DLP), selective laser sintering (SLS), or photocuring a liquid resin system layer by layer via projector or laser to create complicated support structures, including lattices, from various materials that improve the support, mass distribution, and acoustics of the golf club heads. These materials can be metal, non-metal, or combinations thereof.

Binder Jet Process

Figure 1:
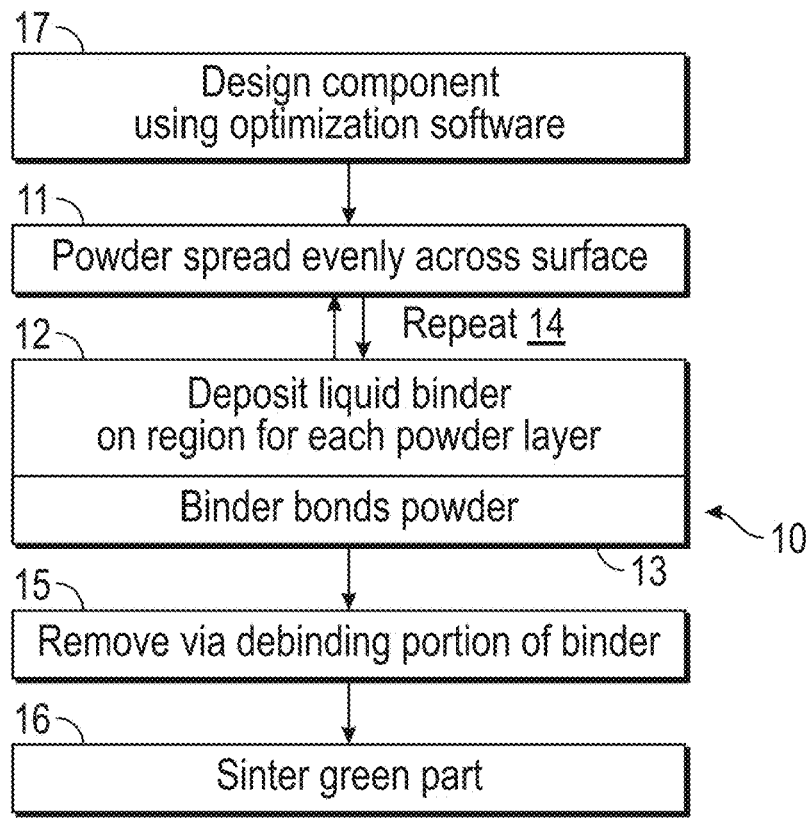
FIG. 1 is a process flow chart illustrating a binder jetting process.
Figure 2:
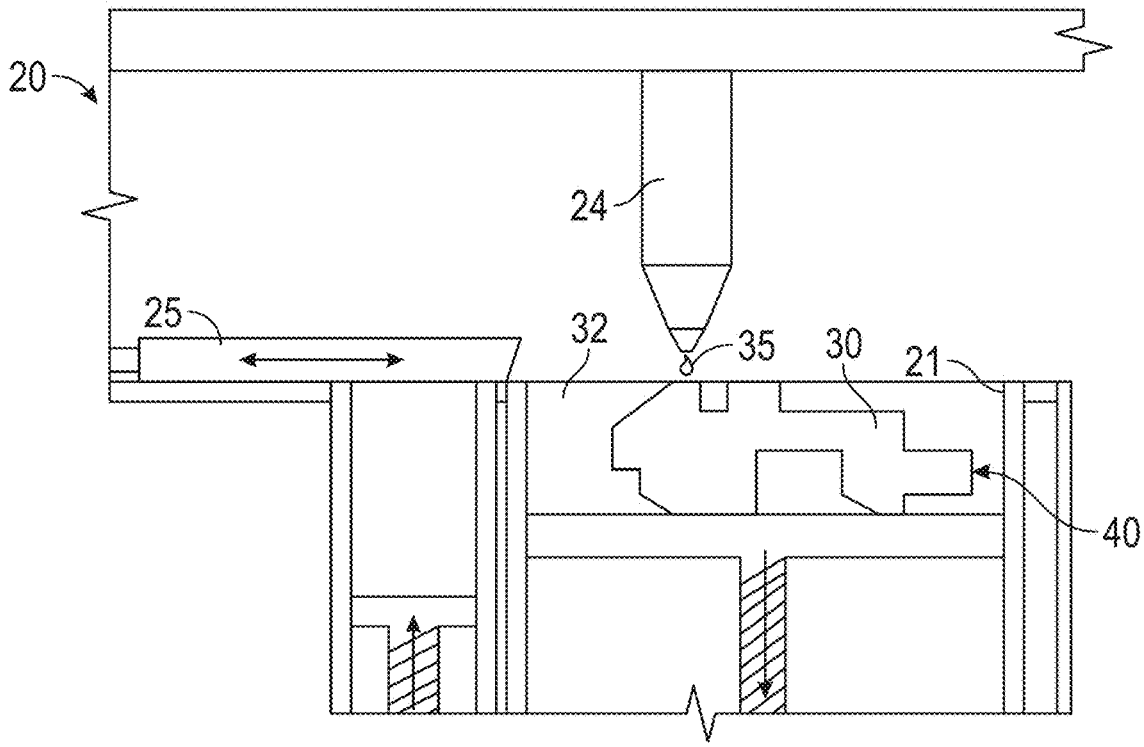
FIG. 2 is an image of an exemplary binder jet machine.
Figure 3:
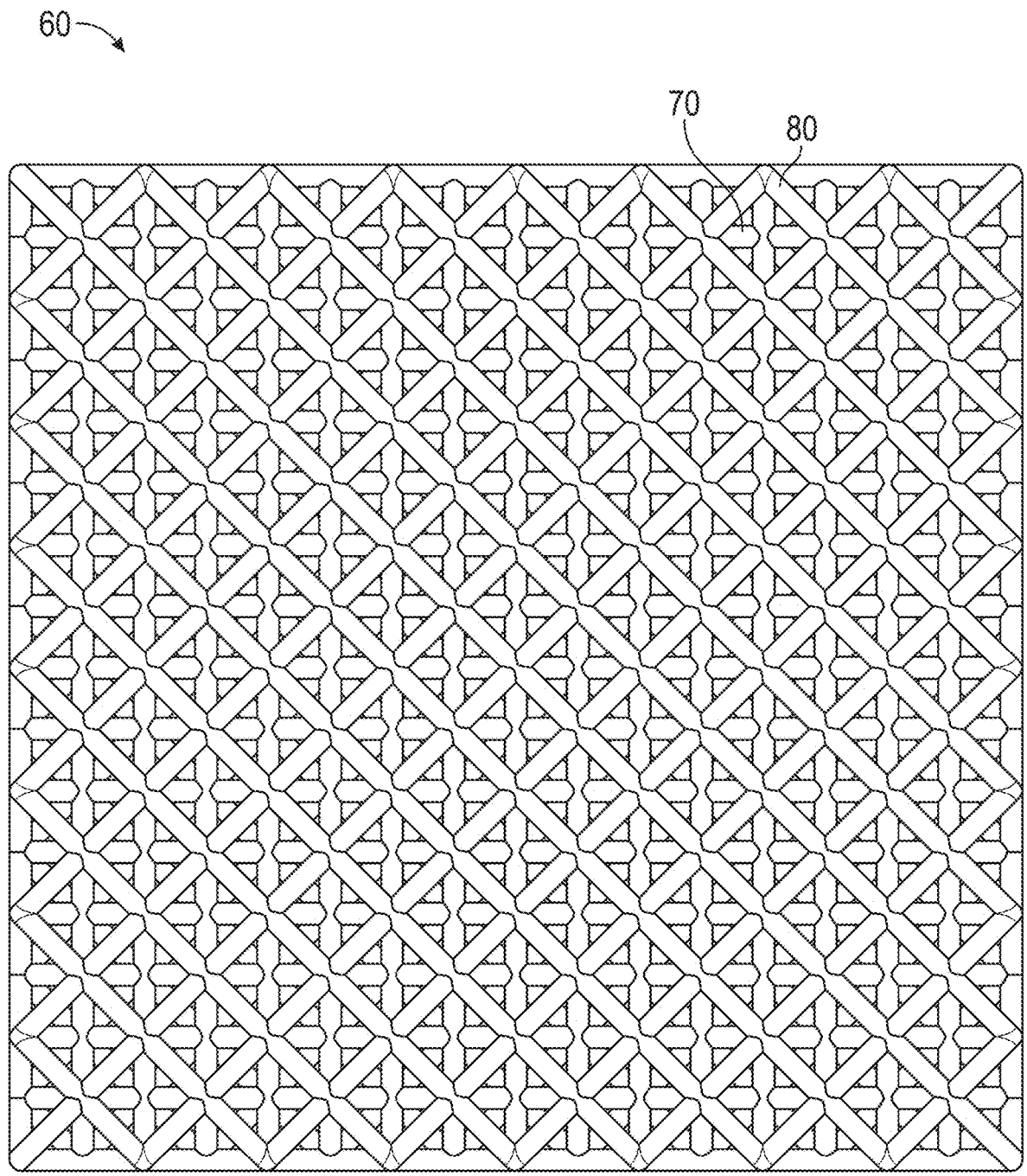
FIG. 3 is a top plan view of a uniform lattice pattern.
Figure 4:
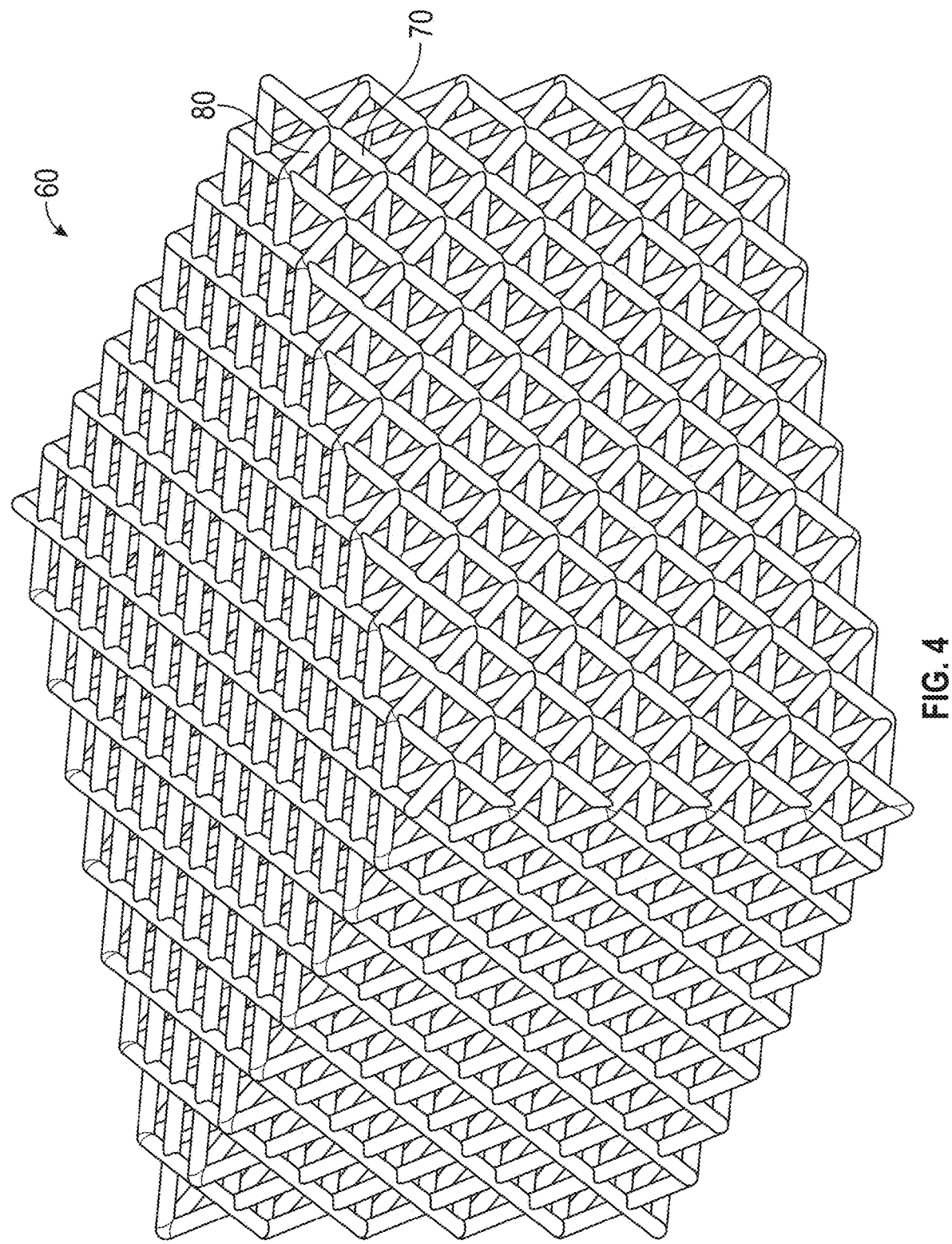
FIG. 4 is a side perspective view of the lattice pattern shown in FIG. 3.
Figure 5:
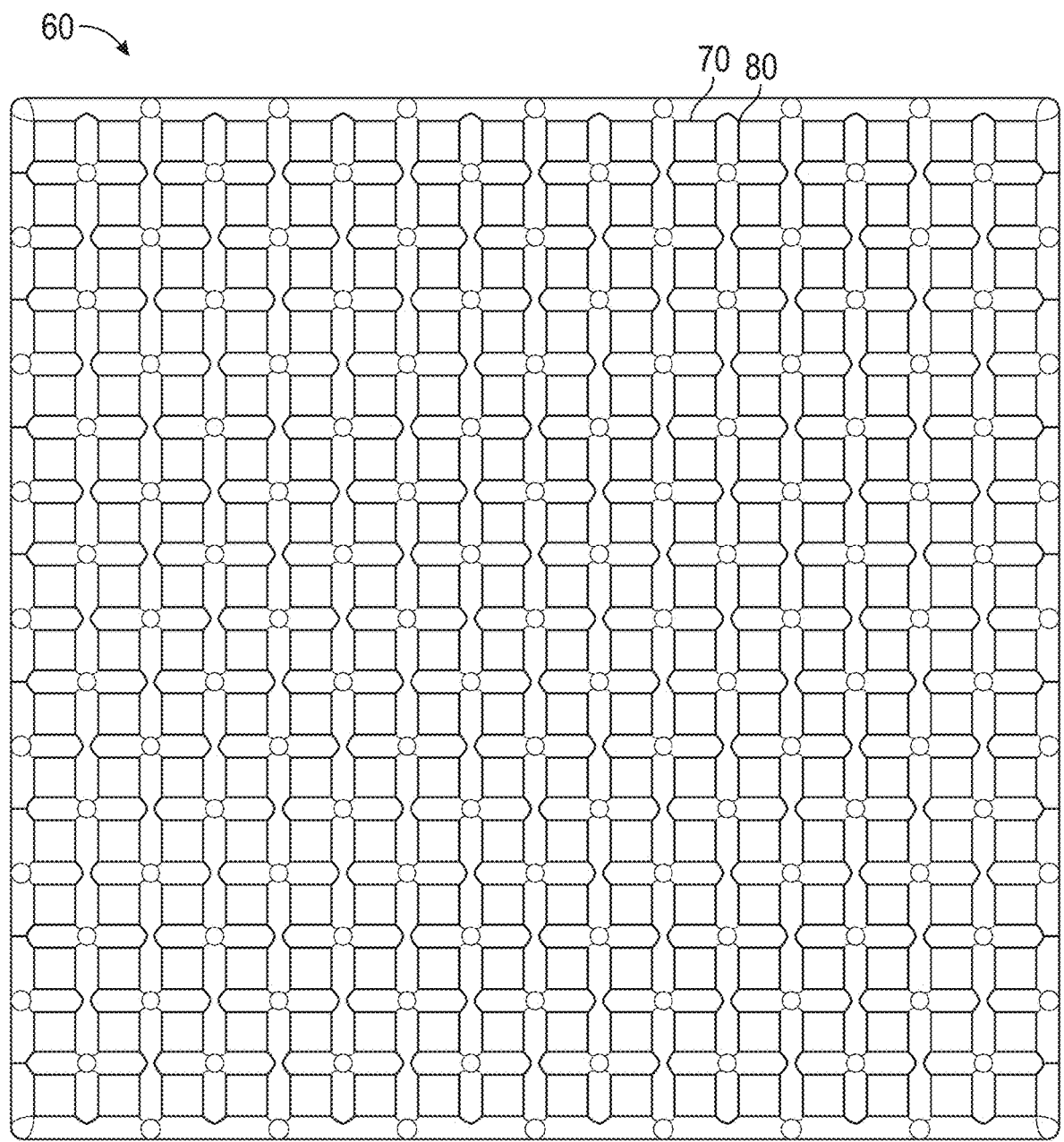
FIG. 5 is a top plan, 40° filtered from XY plane view of the lattice pattern shown in FIG. 3.
Figure 6:
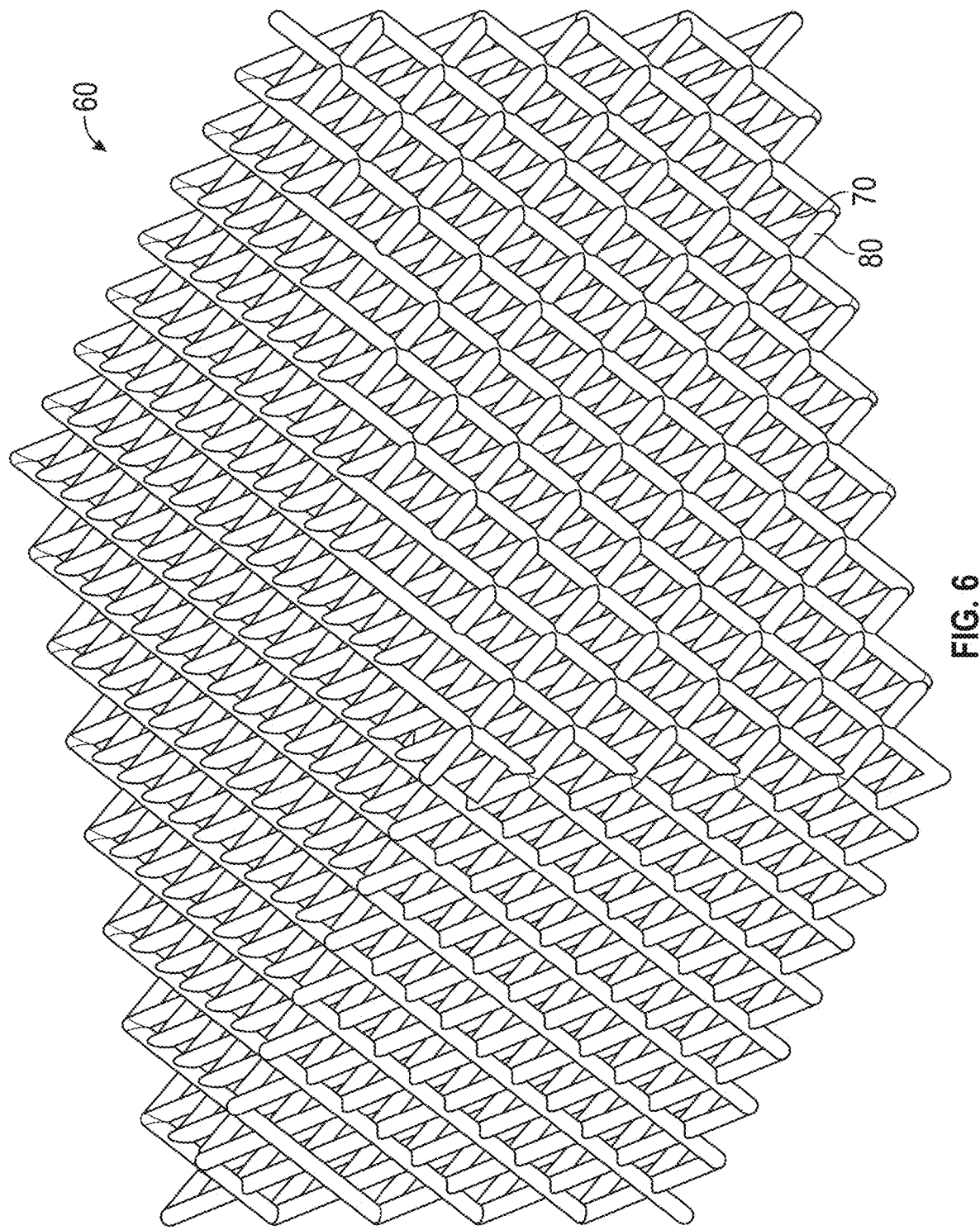
FIG. 6 is a side perspective view of the lattice pattern shown in FIG. 5.
Figure 7:
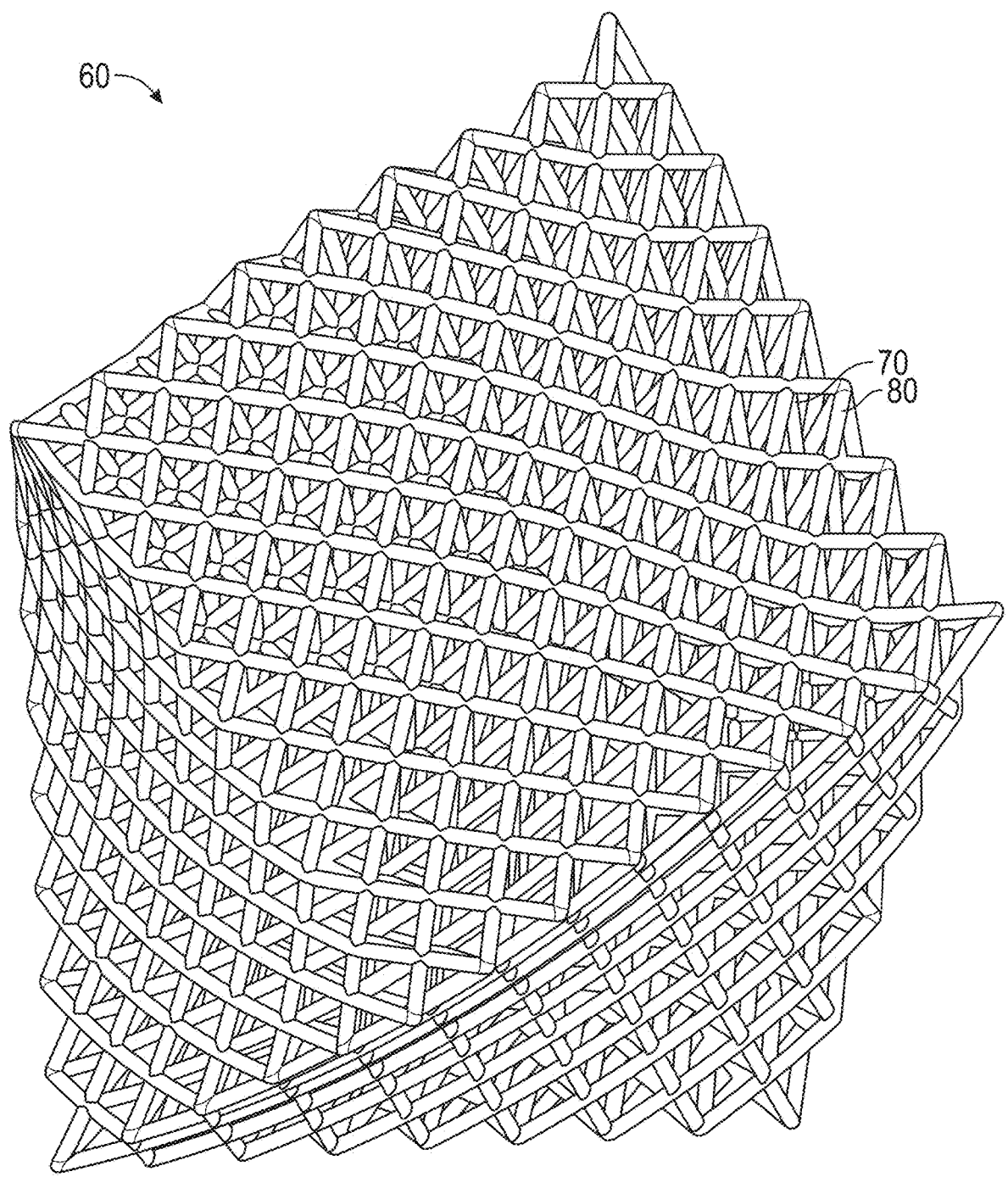
FIG. 7 is a top perspective view of a twisted lattice pattern.
Figure 8:
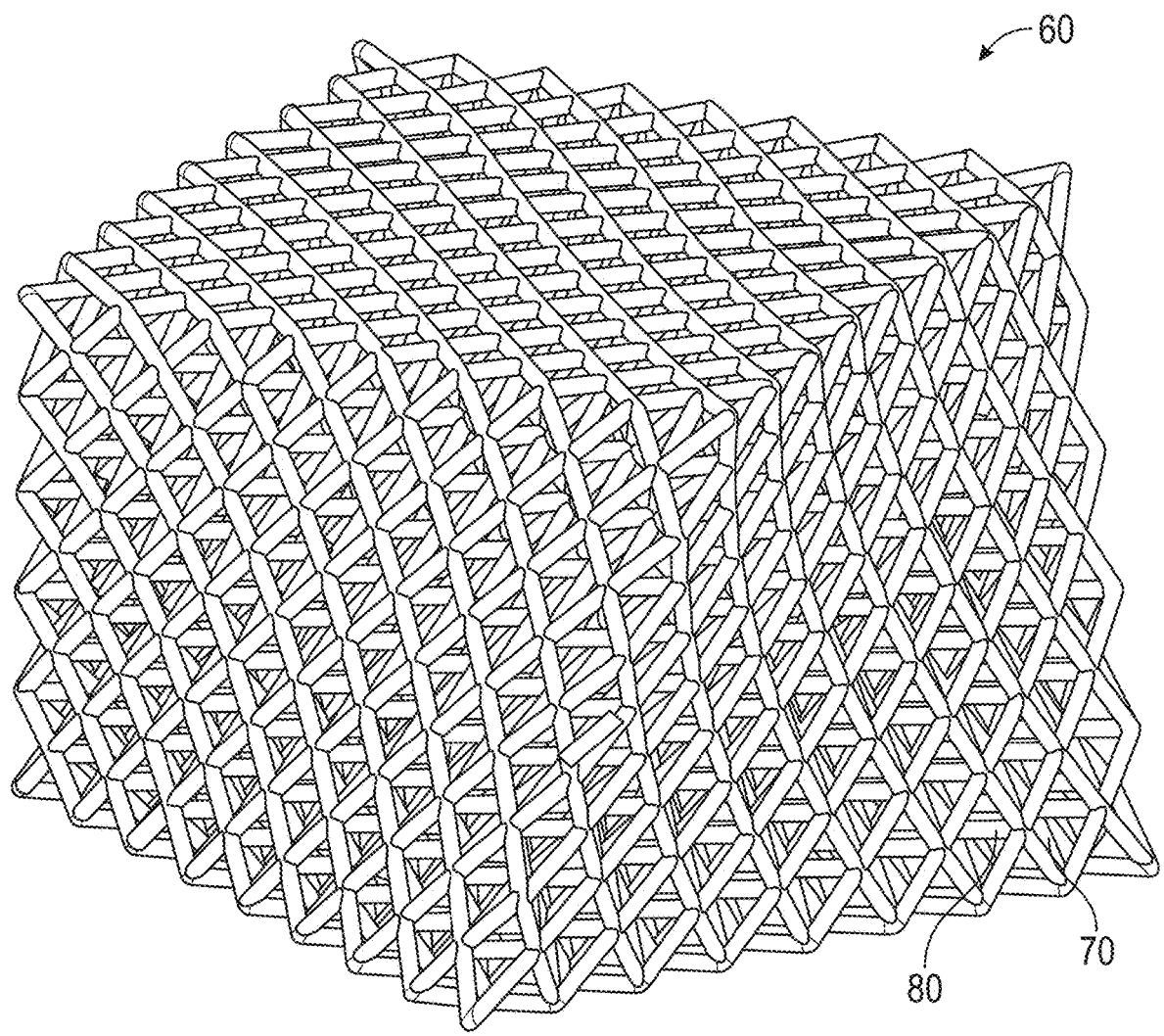
FIG. 8 is a side perspective view of the lattice pattern shown in FIG. 7.
Figure 9:
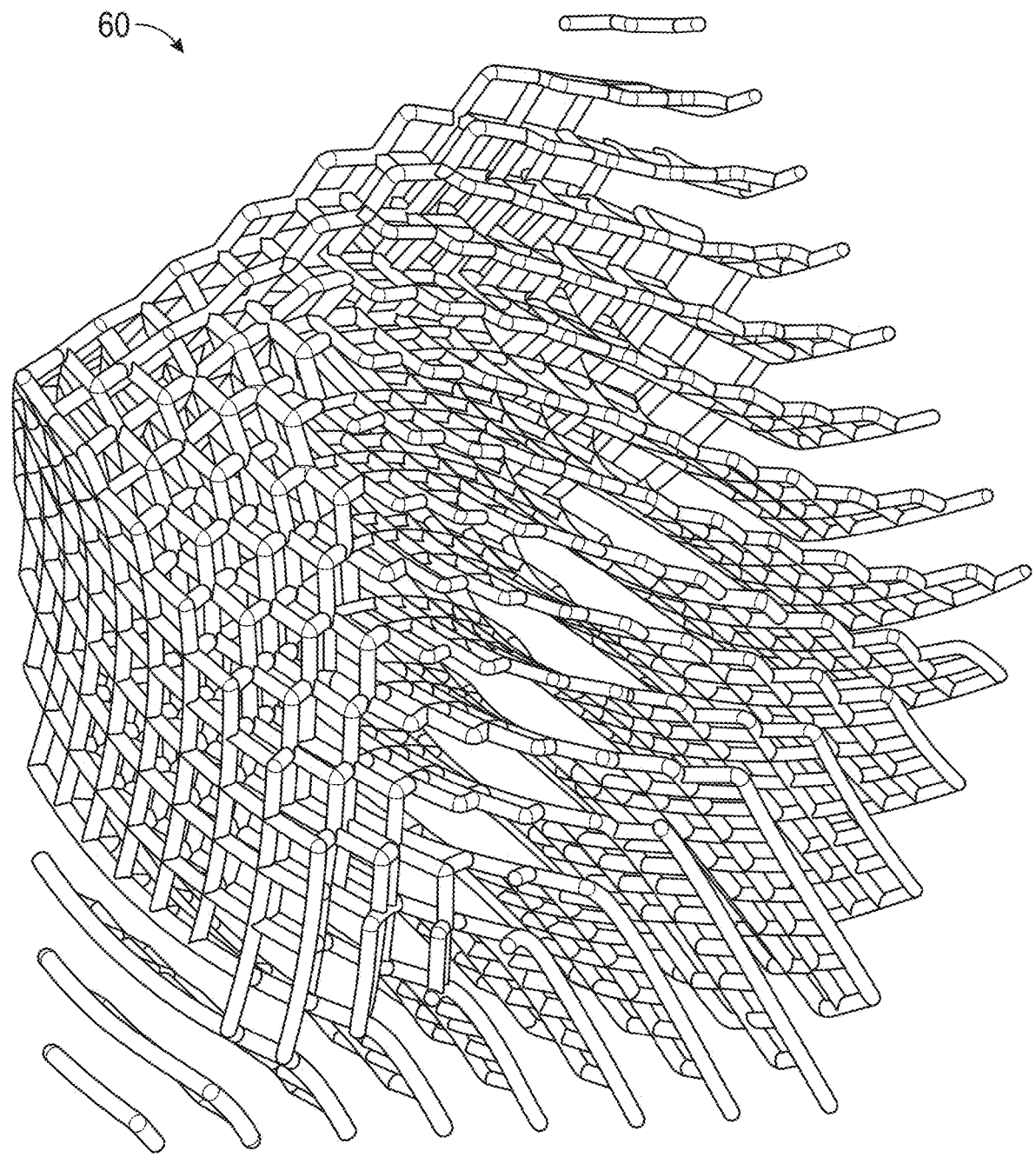
FIG. 9 is a top perspective, 40° filtered from XY plane view of the lattice pattern shown in FIG. 7.
Figure 10:
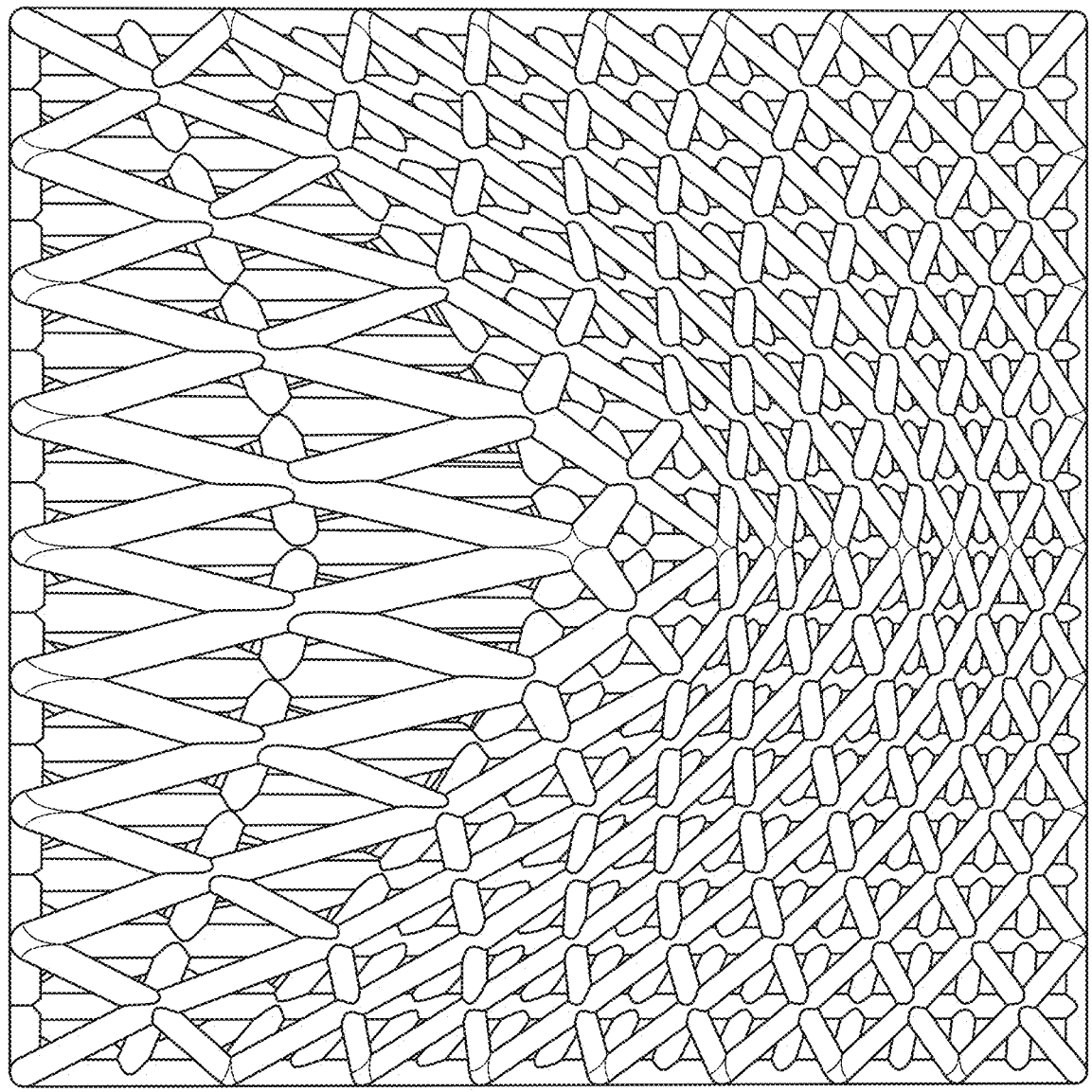
FIG. 10 is a top plan view of a variable density lattice pattern.
Figure 11:
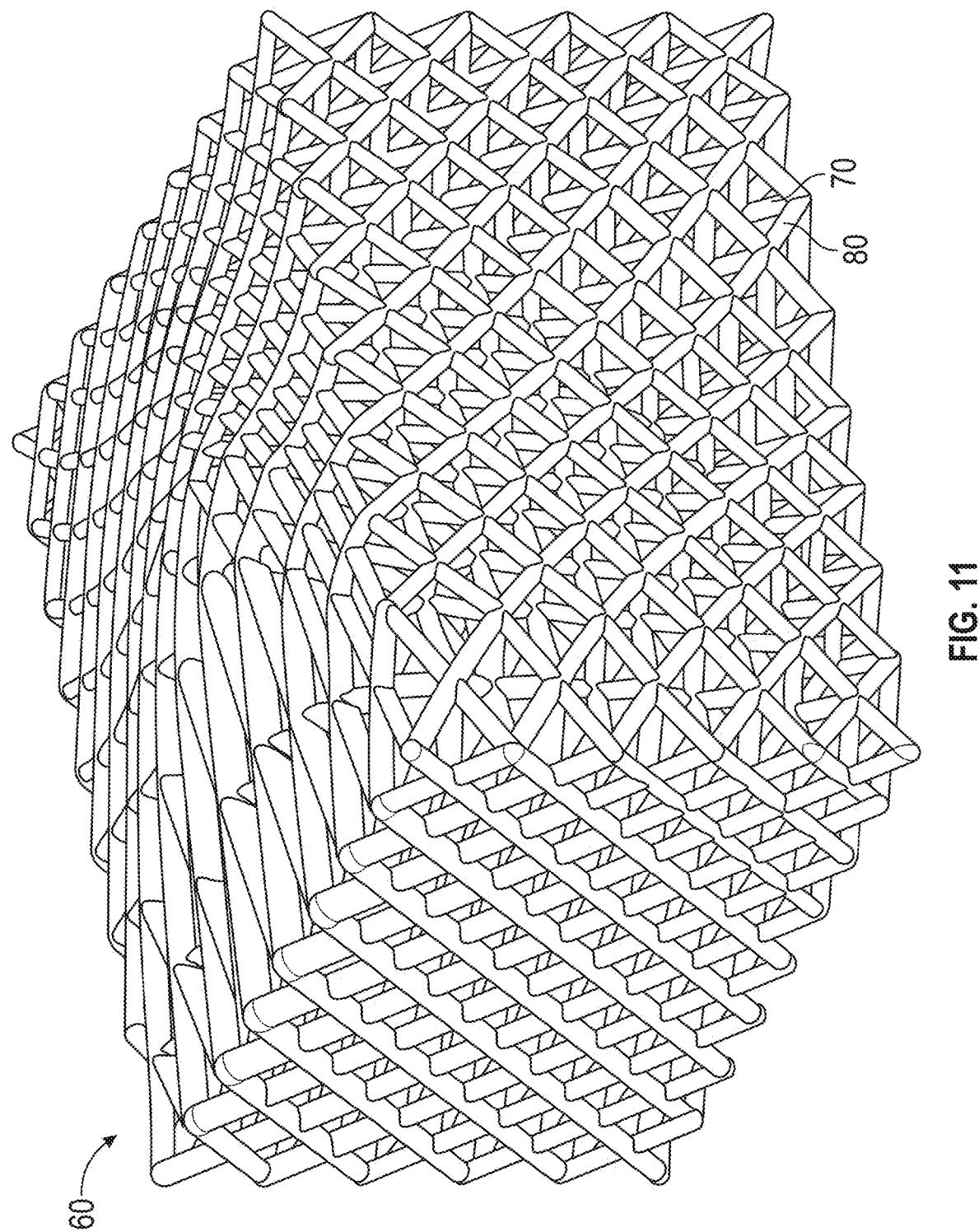
FIG. 11 is a side perspective view of the lattice pattern shown in FIG. 10.
Figure 12:
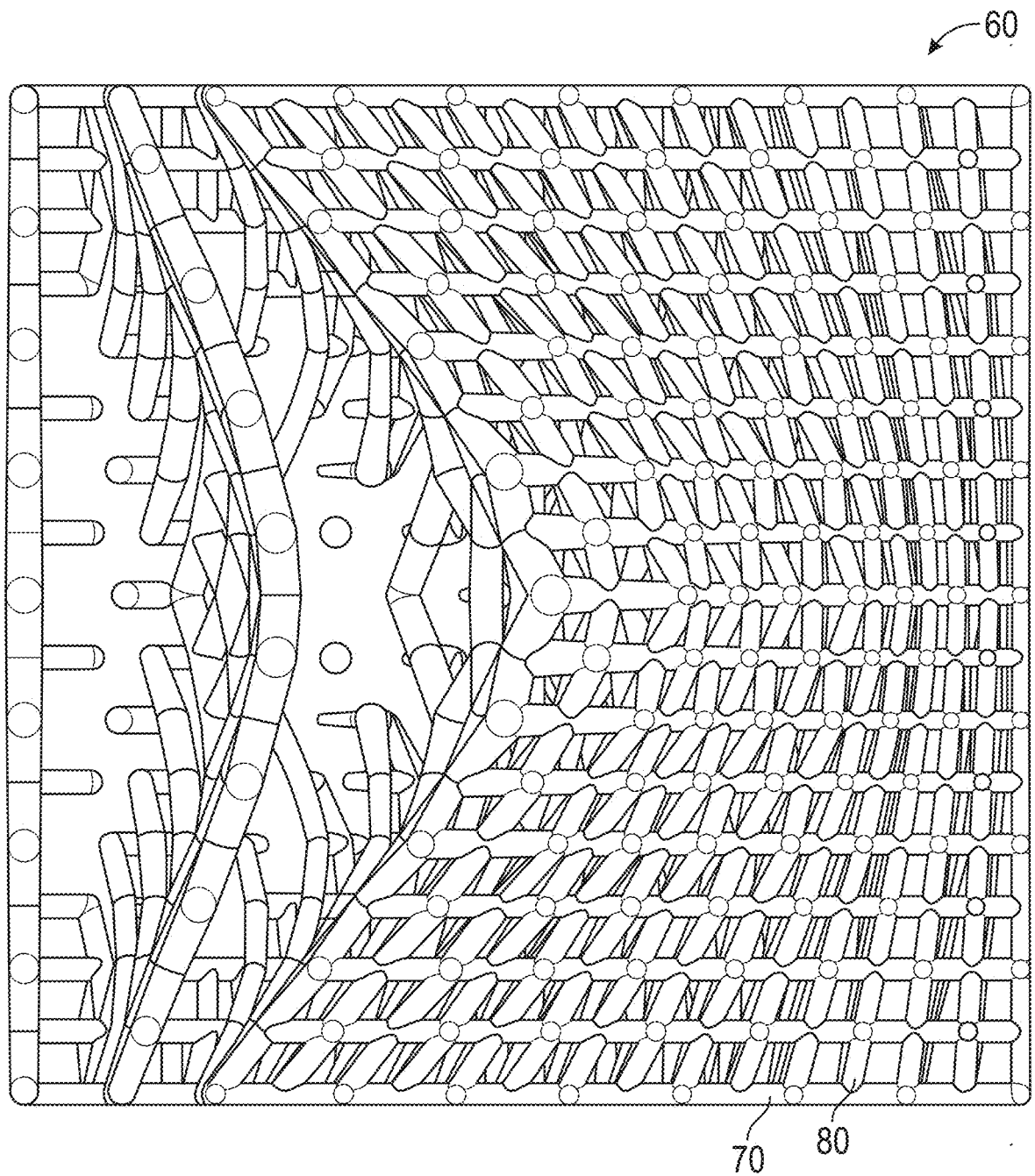
FIG. 12 is a top plan, 40° filtered from XY plane view of the lattice pattern shown in FIG. 10.
Figure 13:
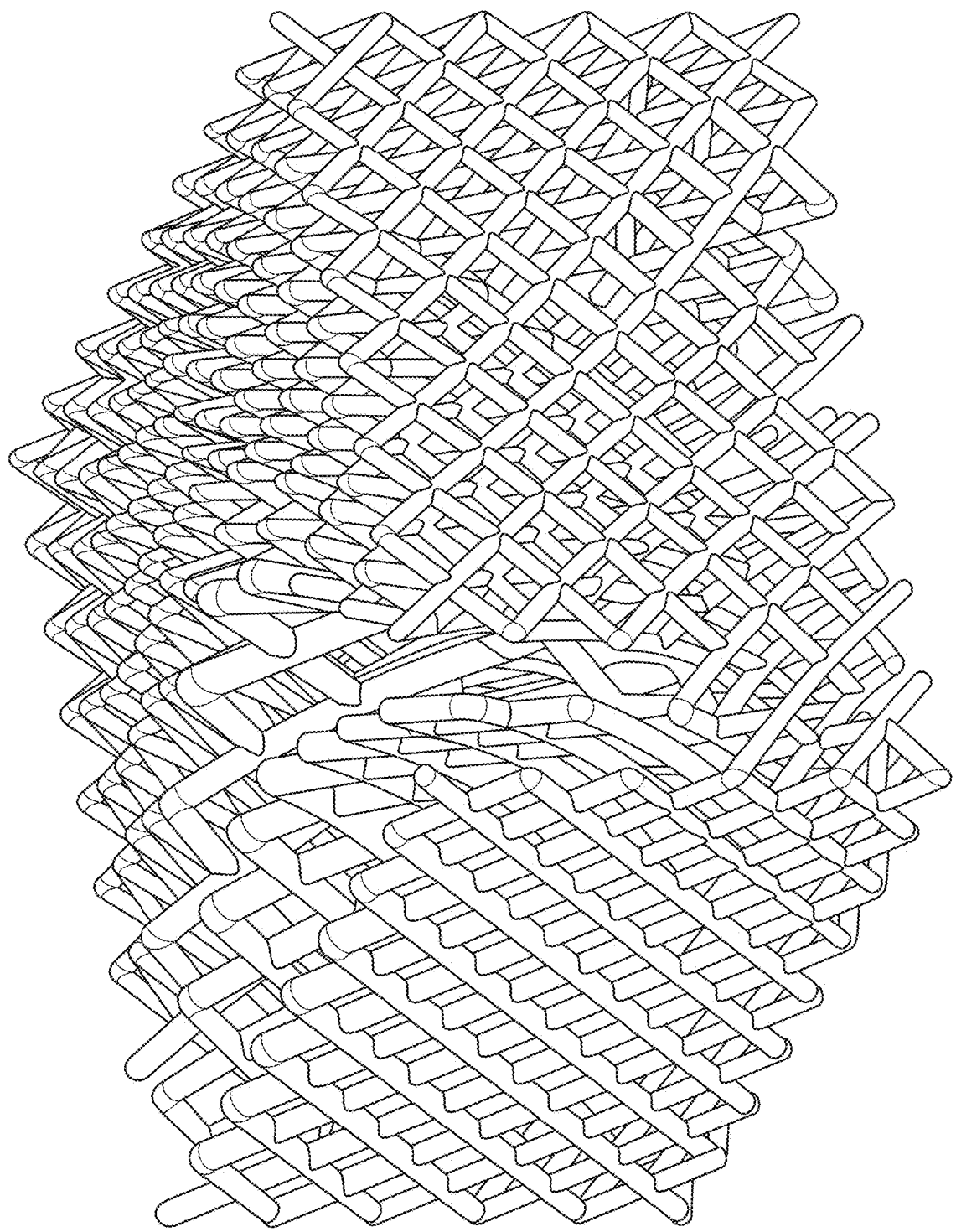
FIG. 13 is a side perspective view of the lattice pattern shown in FIG. 12.

As illustrated in FIGS. 1 and 2, an exemplary binder jet process 10 includes a first step 11 of spreading layers of powder 30 evenly across the build plate 22 of a binder jet machine 20; this step can be performed manually or with a re-coater or roller device 25. This occurs in the build box 21 portion of the binder jet machine 20, where a build plate 22 lowers as each layer of powder 30 is applied. In a second step 12, a printer head 24 deposits liquid binder 35 on the appropriate regions for each layer of powder 30, leaving unbound powder 32 within the build box 21. In a third step 13, the binder bonds adjacent powder particles together. In a fourth step 14, the first and second steps 11, 12 are repeated as many times as desired by the manufacturer to form a green (unfinished) part 40 with an intended geometry.

In an optional fifth step 15, a portion of the binder 35 is removed using a debinding process, which may be via a liquid bath or by heating the green part to melt or vaporize the binder. In a sixth step 16, the green part 40 is sintered in a furnace, where, at the elevated temperature, the metal particles repack, diffuse, and flow into voids, causing a contraction of the overall part. As this sintering step 16 continues, adjacent particles eventually fuse together, forming a final part 50, examples of which are shown in FIGS. 18-40. This process causes 10-25% shrinkage of the part from the green state 40 to its final form 50, and the final part has a void content that is less than 10% throughout. In some embodiments, the debinding and sintering steps 15, 16 may be conducted in the same furnace. In an optional step 17, before the binder jet process 10 begins, optimization software can be used to design a high performance club head or component in CAD. This step allows the manufacturer to use individual player measurements, club head delivery data, and impact location in combination with historical player data and machine learning, artificial intelligence, stochastic analysis, and/or gradient based optimization methods to create a superior club component or head design.

Though binder jetting is a powder-based process for additive manufacturing, it differs in key respects from other directed energy powder based systems like DMLS, DMLM, and EBAM. The binder jet process 10 provides key efficiency and cost saving improvements over DMLM, DMLS, and EBAM that makes it uniquely suitable for use in golf club component manufacturing. For example, binder jetting is more energy efficient because it is not performed at extremely elevated temperatures and is a much less time consuming process, with speeds up to one hundred times faster than DMLS. The secondary debinding step 15 and sintering step 16 are batch processes which help keep overall cycle times low, and green parts 40 can be stacked in a binder jet machine 20 in three dimensions because the powder is generally self-supporting during the build process, obviating the requirement for supports or direct connections to a build plate. Therefore, because there is no need to remove beams, members, or ligaments because of length, aspect ratio, or overhang angle requirements, lattice structures can take any form and have a much wider range of geometries than are possible when provided by prior art printing methods.

The binder jet process 10 also allows for printing with different powdered materials, including metals and non-metals like plastic. It works with standard metal powders common in the metal injection molding (MIM) industry, which has well-established and readily available powder supply chains in place, so the metal powder used in the binder jet process 10 is generally much less expensive than the powders used in the DMLS, DMLM, and EBAM directed energy modalities. The improved design freedom, lower cost and faster throughput of binder jet makes it suitable for individually customized club heads, prototypes, and larger scale mass-produced designs for the general public.

Photocuring Processes

Figure 42:
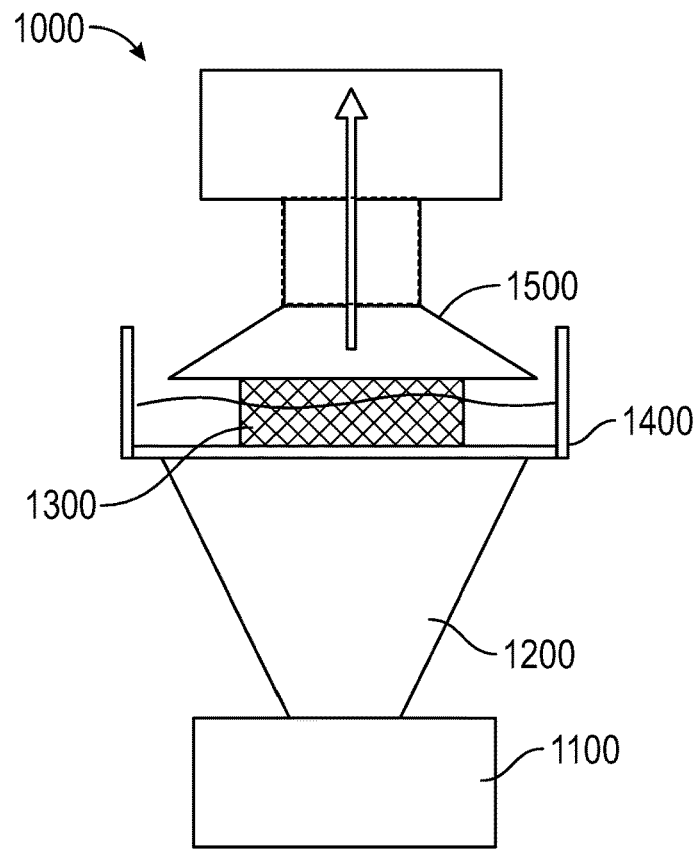
FIG. 42 is an image of an exemplary digital light synthesis or digital light processing machine.
Figure 43:
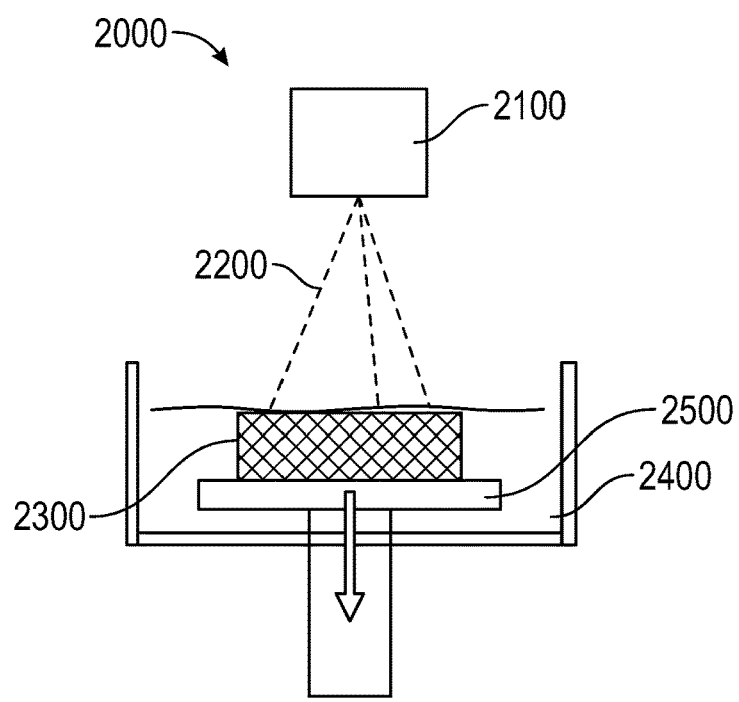
FIG. 43 is an image of an exemplary stereolithography machine.

Other preferred additive manufacturing processes include digital light synthesis (DLS), digital light processing (DLP), and stereolithography (SLA). In these processes, liquid photopolymers are selectively cured and turned into solids by exposure to light. The resulting part may include enveloping surfaces, lattice structures, and other structures disclosed herein. In DLS and DLP, entire layers of the part are cured at once via exposure to light from a projector, as illustrated in FIG. 42. This system 1000 comprises a projector 1100 projecting light 1200 onto a liquid resin tank 1400 in which a part 1300 is assembled and cured from a build platform 1500. In SLA, the parts are cured via exposure to point sources of light, which are typically generated by lasers, as illustrated in FIG. 43. In this system 2000, a laser light source 2100 projects light 2200 into a liquid resin tank 2400 supported by a build platform 2500, and in which a part 2300 is cured. These processes can create overhangs that are easier to work with for manufacturers, as they relate to shorter beams and finer structures.

The curing or solidification of a part can be completed on the printer or via a partial cure. In the case of a partial cure, sometimes a post-processing operation is required. The post-cure process may be additional exposure to light, exposure to elevated temperatures, exposure to chemicals via liquids and/or gases, or some combination of the above.

The DLP, DLS, and SLA processes allow for the creation of transparent or translucent polymer components, which refer to materials that allow a significant fraction (or easily noticeable) portion of the incoming visible light to pass through from one side of the part to the other. Transparent materials allow light to pass through without imparting any easily noticeable tint or color; casual observers might refer to transparent components as "clear." Translucent materials also allow light to pass through, though less light than for translucent materials, while also imparting a tint of color.

Transparent or translucent materials are desirable in golf products to allow consumers to see into a product and view technology that otherwise would be hidden from view. If a lattice is enclosed in a shell made of transparent or translucent material, the consumer will be able to see the complex and visually appealing lattice structure through the enclosing surface. The part will be more structurally sound when the lattice is at least partially enclosed within a shell. This can be preferable to enclosing the lattice with an opaque material and eliminating visibility entirely, or leaving a lattices structure open and uncovered, which is generally discouraged because debris can get stuck inside the lattice during play. Furthermore, the rules of golf generally prohibit a golf club head (aside from putters) from having through-holes.

Lattice Structures

The binder jet and photocuring processes described above allow for the creation of lattice structures, including those with beams that would otherwise violate the standard overhang angle limitation set by DMLM, DMLS, and EBAM. They can also be used to create triply periodic minimal surfaces (TPMS) and non-periodic or non-ordered collections of beams.

Compressing or otherwise reducing the size of cells in a section of the lattice increases the effective density and stiffness in those regions. Conversely, expanding the size of the cells is an effective way to intentionally design in a reduction of effective density and stiffness. Effective density is defined as the density of a unit of volume in which a fully dense material may be combined with geometrically designed-in voids, which can be filled with air or another material, and/or with another or other fully dense materials. The unit volume can be defined using a geometrically functional space, such as the lattice cell shown in FIGS. 22-23 or a three dimensional shape fitted to a typical section, and in particular the volume of a sphere with a diameter that is three to five times the equivalent diameter of the nearest beam or collection of beams. The binder jet process and photocuring processes allow for the creation of a structure with a uniform final material density of at least 90%, which contrasts with previous uses of DMLM, DMLS, and EBAM to change the actual material density by purposely creating unstructured porosity in parts.

Figure 22:
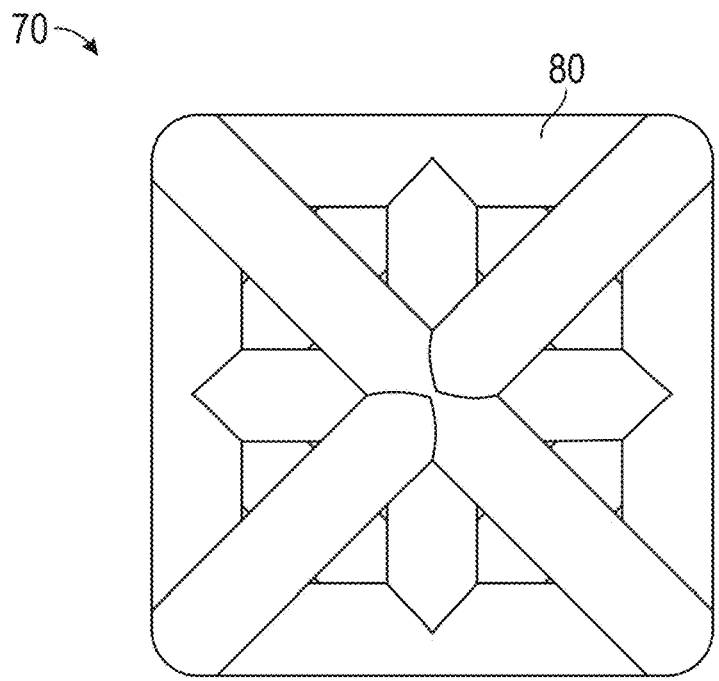
FIG. 22 is a top plan view of a unit cell of a lattice.
Figure 23:
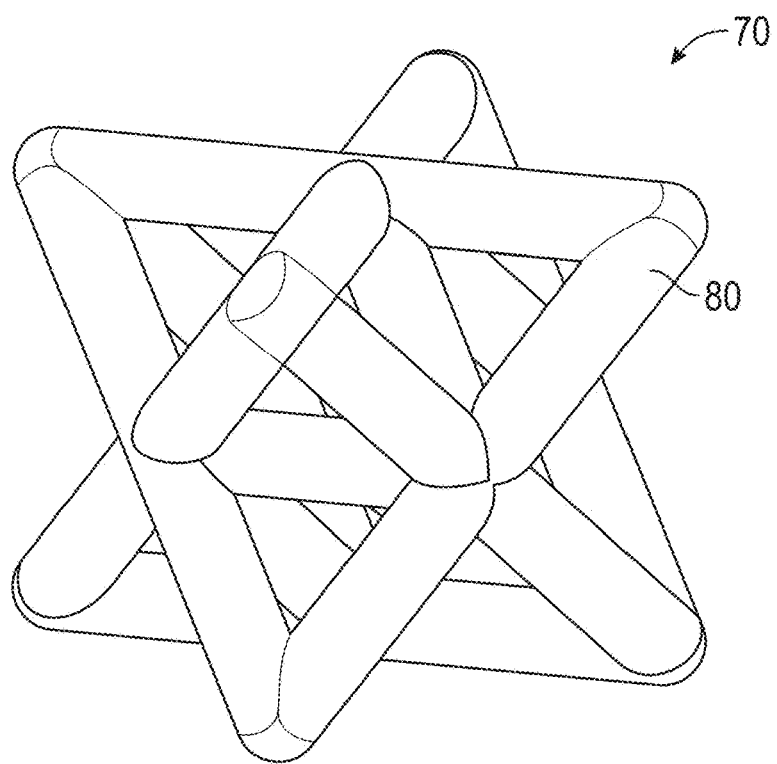
FIG. 23 is a side perspective view of the unit cell shown in FIG. 22.

Examples of lattice structures 60 that can be created using the processes described above are shown in FIGS. 3-21, and include warped, twisted, distorted, curved, and stretched lattices that can optimize the structure for any given application. Individual lattice cells 70 are shown in FIGS. 22-23, and may be used in addition to or instead of more complex lattice structures 60. FIGS. 5, 6, 9-10, 12, 16, 20 and 21 illustrate what the more complicated structures look like when a 40-degree overhang limitation is applied: a significant portion of the structure is lost. Another benefit of not having an overhang angle limitation is that manufacturers can create less ordered or non-ordered collections of beams. The lattice structures 60 shown herein may have repeating cells 70 or cells with gradual and/or continuously changing size, aspect ratio, skew, and beam diameter. The change rate between adjacent cells 70 and beams 80 may be 10%, 25%, 50%, and up to 100%, and this change pattern may apply to all or only some of the volume occupied by the lattice structure.

Figure 14:
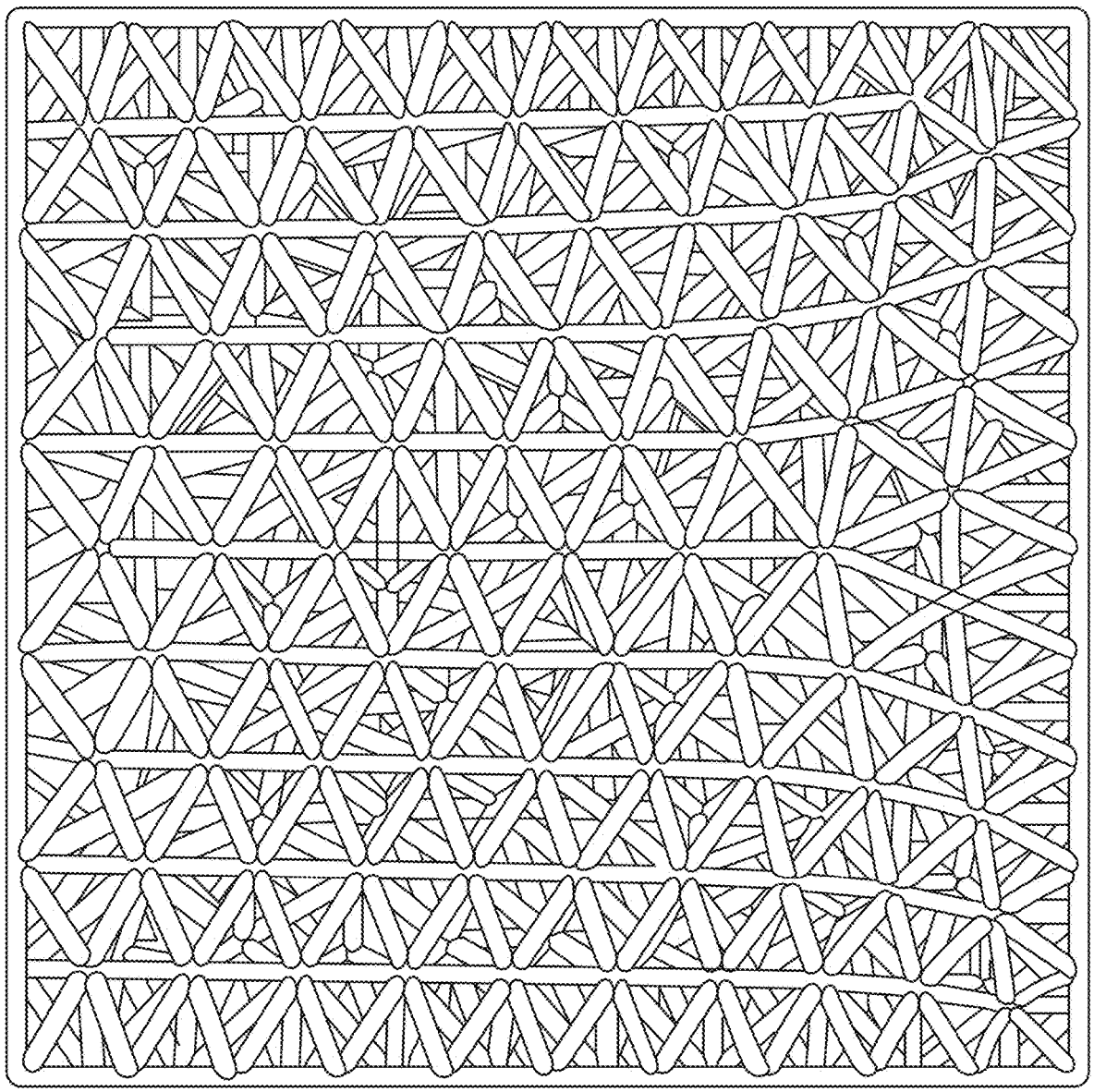
FIG. 14 is a top plan view of a non-ordered collection of beams and tetrahedral cell lattice pattern.
Figure 15:
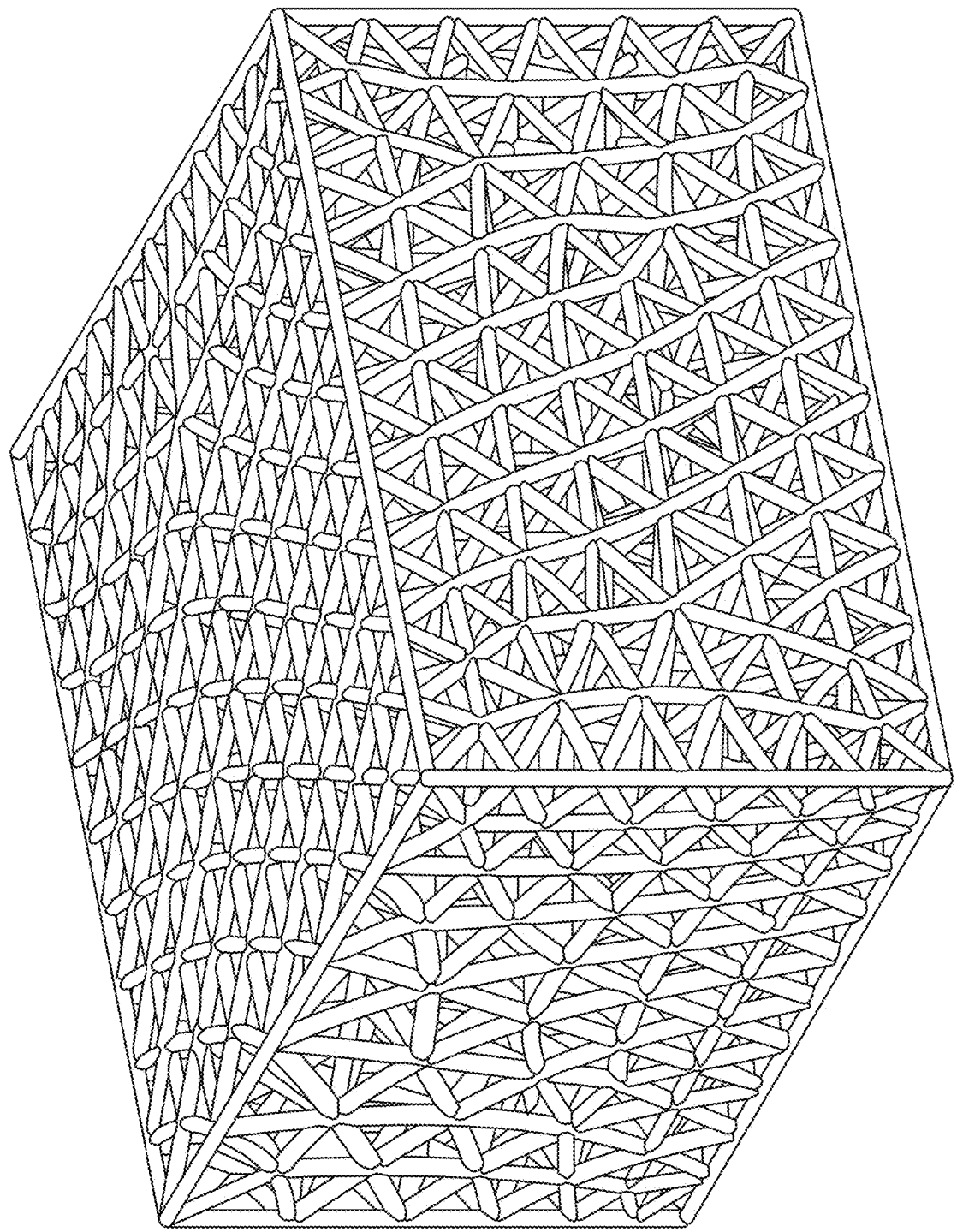
FIG. 15 is a side perspective view of the lattice pattern shown in FIG. 14.
Figure 16:
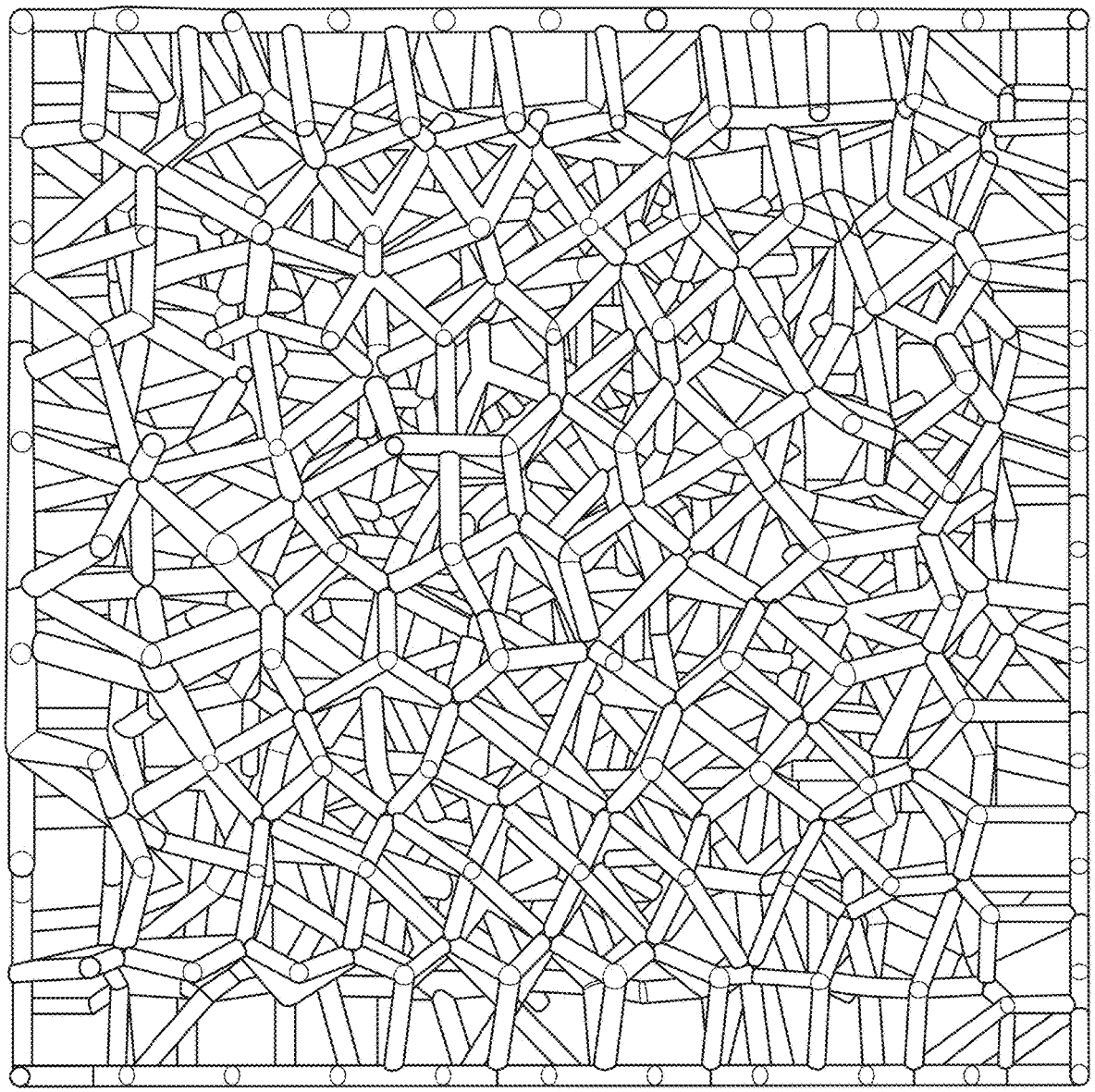
FIG. 16 is a top plan, 40° filtered from XY plane view of the lattice pattern shown in FIG. 14.
Figure 17:
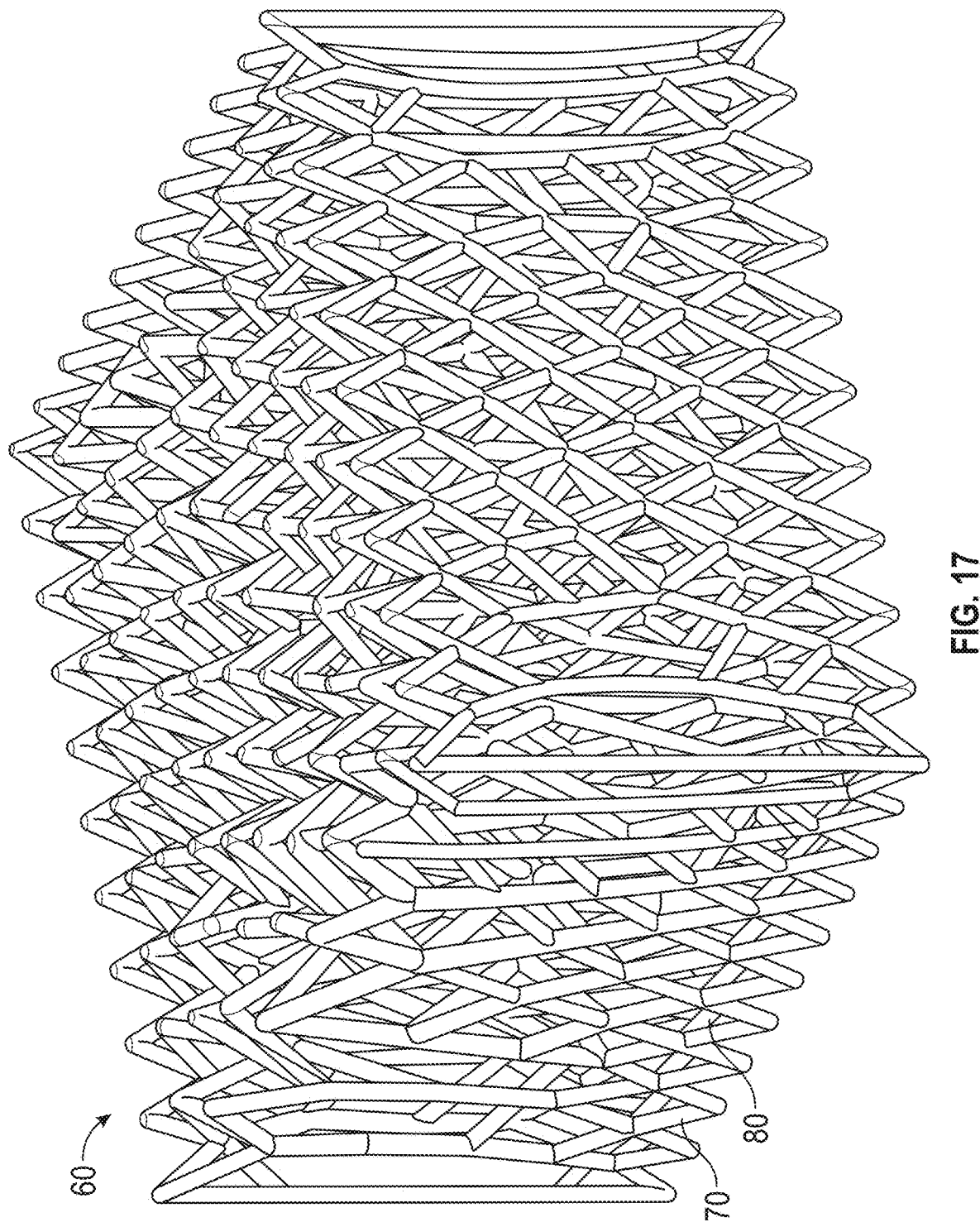
FIG. 17 is a side perspective view of the lattice pattern shown in FIG. 16.
Figure 18:
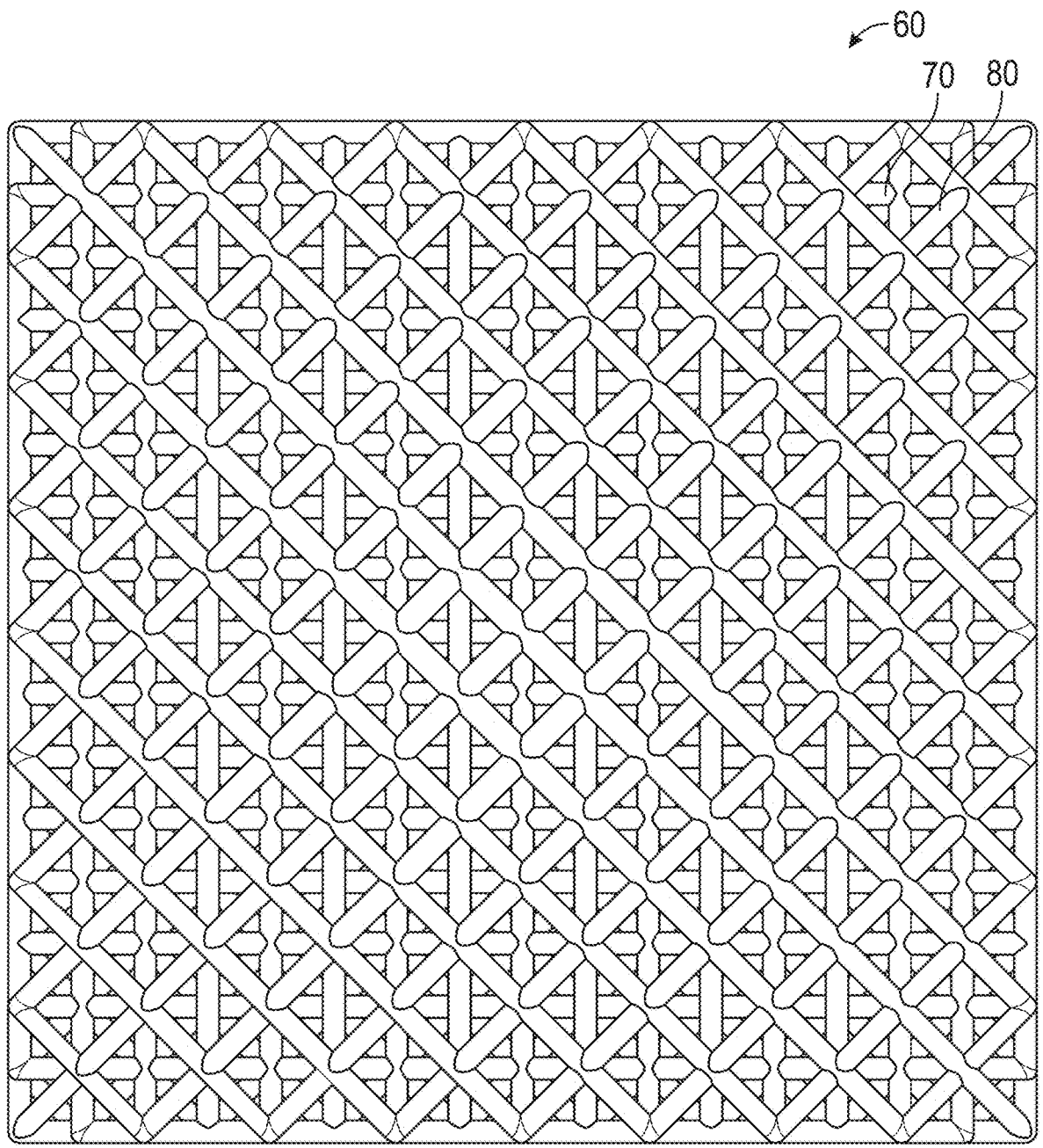
FIG. 18 is top plan view of a conformal, spherical top lattice pattern.
Figure 19:
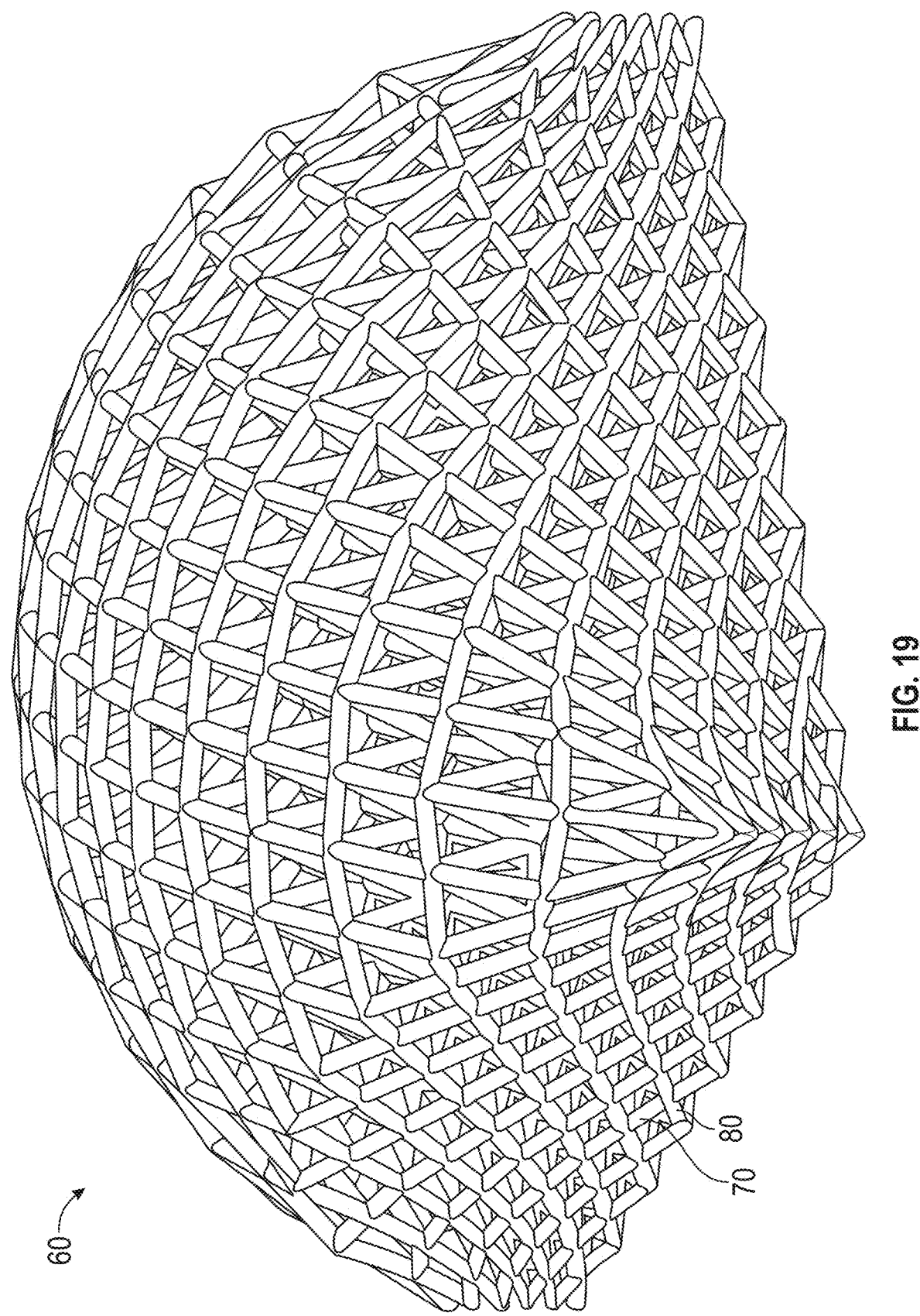
FIG. 19 is a side perspective view of the lattice pattern shown in FIG. 18.
Figure 20:
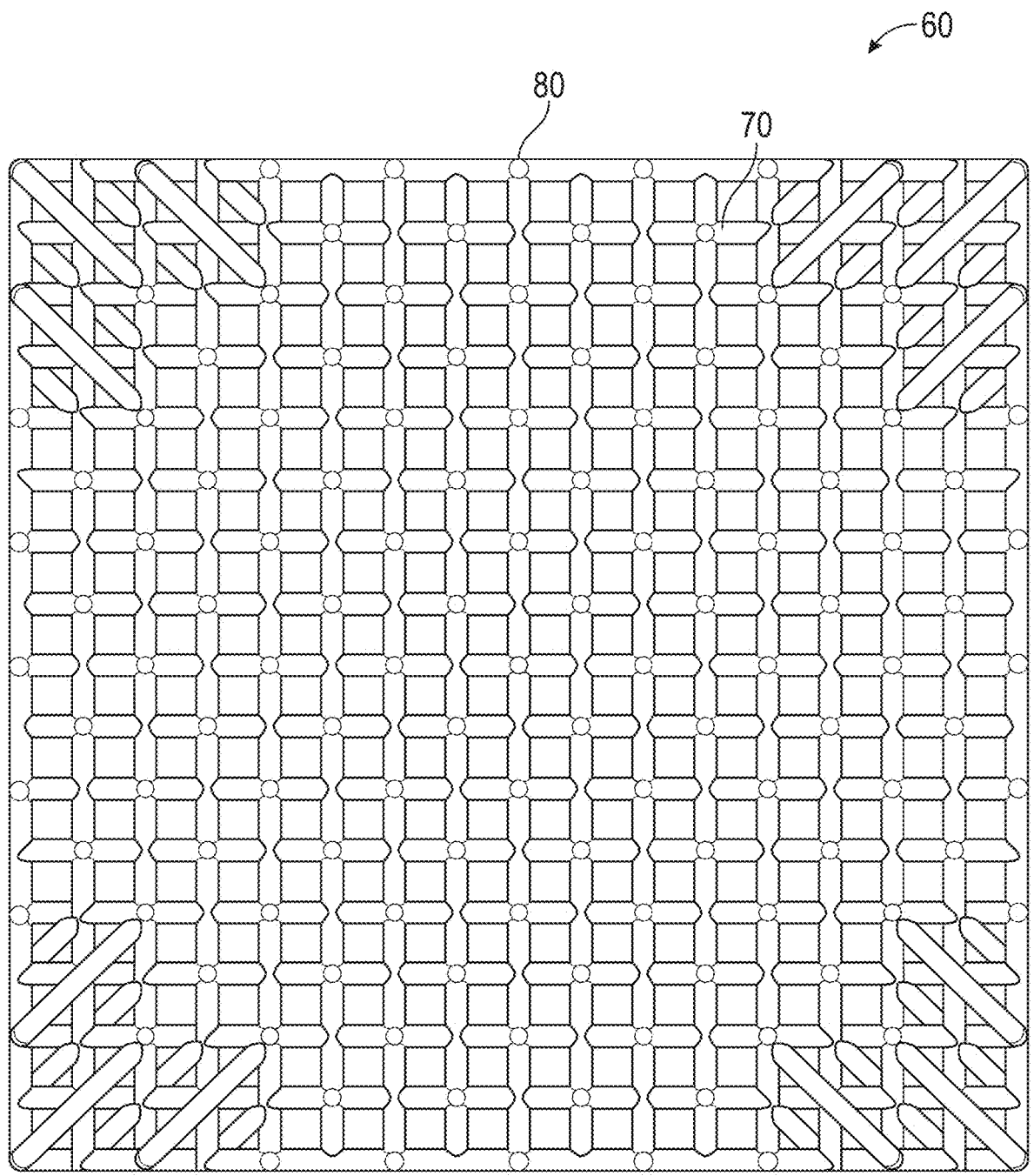
FIG. 20 is a top plan, 40° filtered from XY plane view of the lattice pattern shown in FIG. 18.
Figure 21:
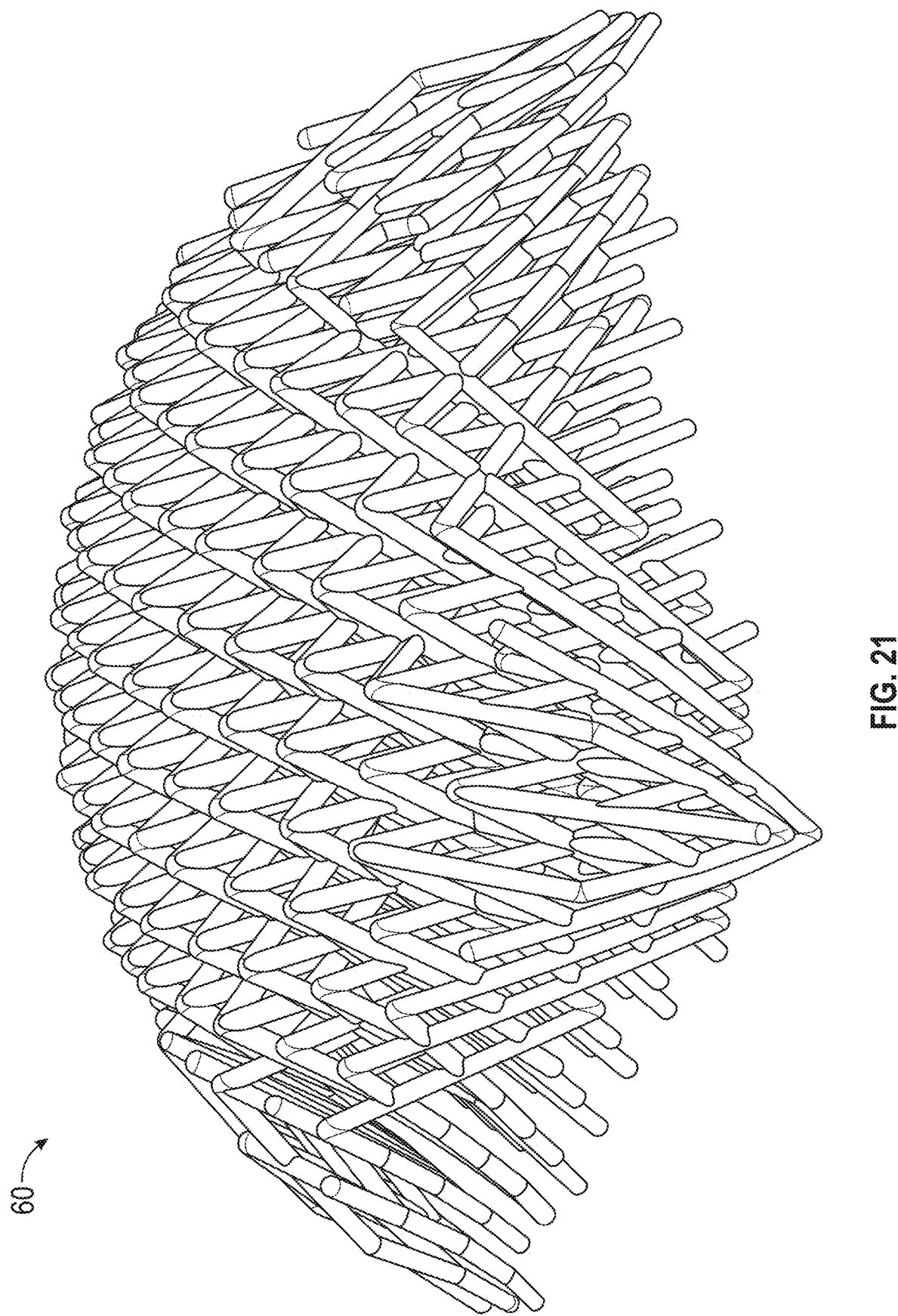
FIG. 21 is a side perspective view of the lattice pattern shown in FIG. 20.

Cell 70 type can change abruptly if different regions of a component need different effective material properties, but size, aspect ratio, skew, beam diameter can then change continuously as distance from the cell type boundary increases. The diameter of the beams 80 may be constant or tapered, and while their cross sections are typically circular, they can also be elliptical like the structural members disclosed in U.S. Pat. No. 10,835,789, the disclosure of which is hereby incorporated by reference in its entirety herein. Such structures may take the form of a series of connected tetrahedral cells 70, as shown in FIGS. 14-15. The lack of an overhang constraint allows for the beams 80 to be oriented in any fashion and therefor allows for the generation of a conformal lattice of virtually any size and shape. Modern meshing software also provide quick and simple method by which to fill volumes and vary the lattice density via non-ordered tetrahedral cells. Tetrahedral cells 70 are also very useful for varying cell size and shape throughout a part.

Lattice Applications in Golf Club Heads

Figure 28:
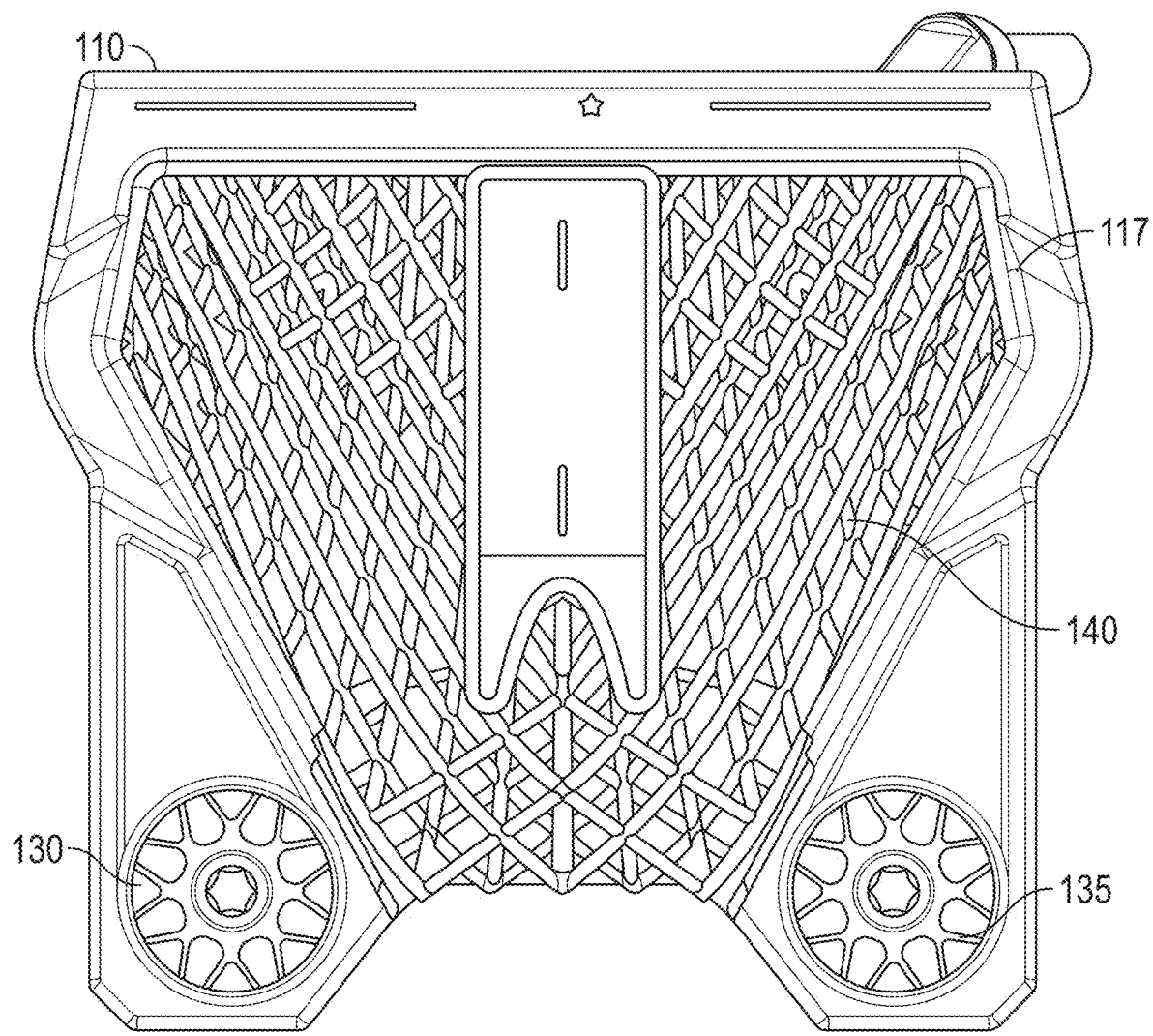
FIG. 28 is a sole plan view of another embodiment of a putter head with a sole puck formed from a lattice.
Figure 29:
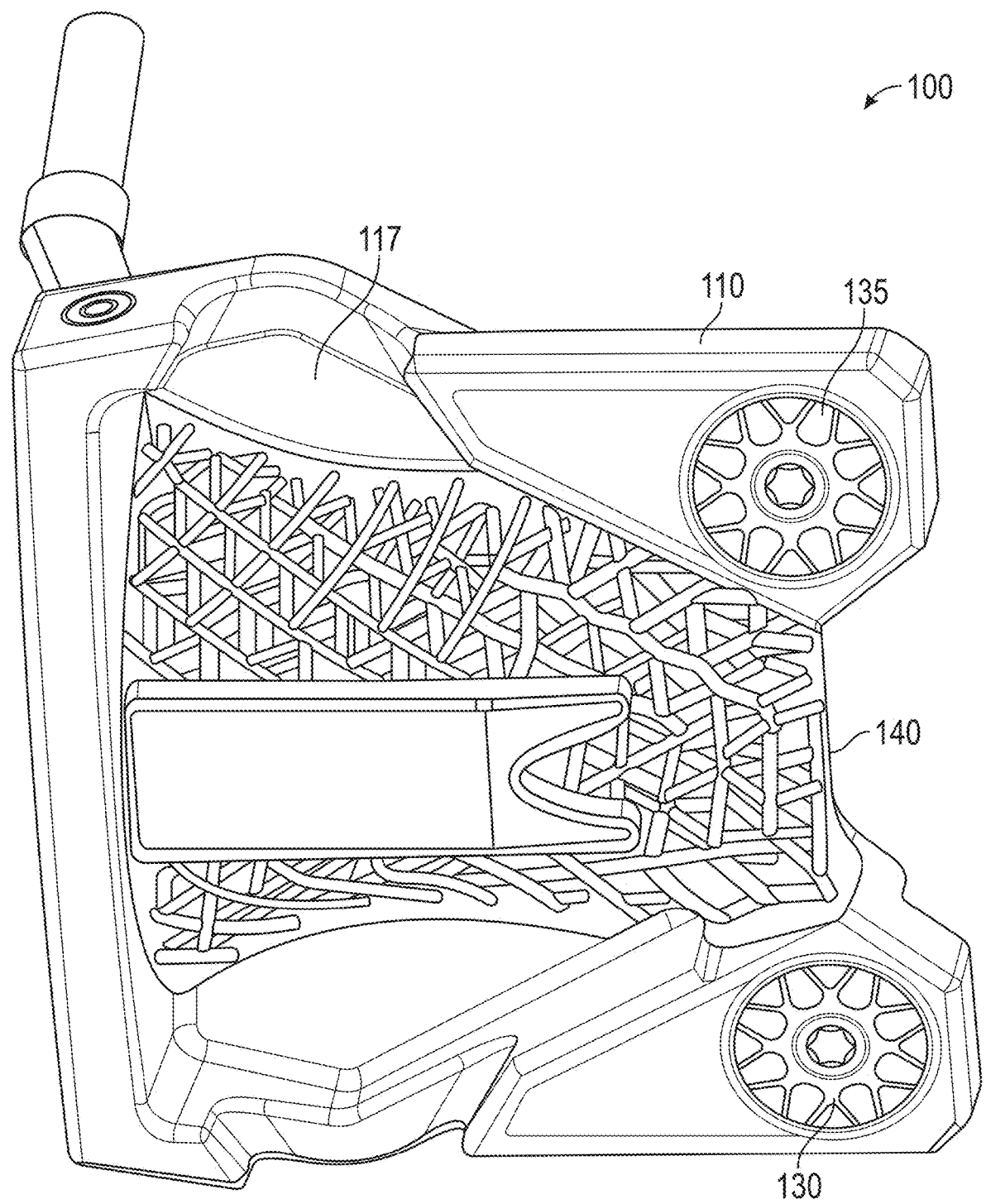
FIG. 29 is a sole perspective view of another embodiment of a putter head with a sole puck formed from a lattice.
Figure 30:
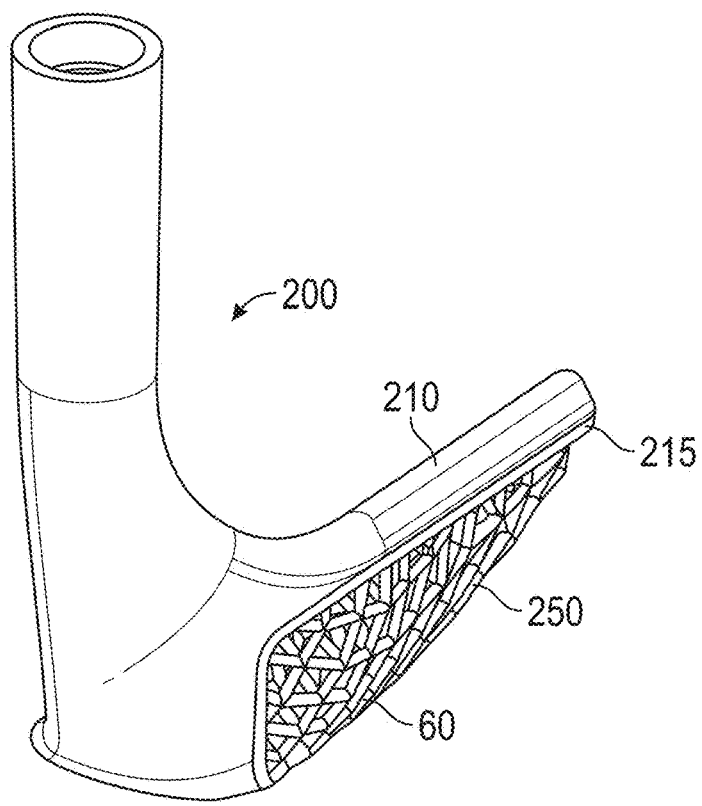
FIG. 30 is a side perspective view of an iron head with a rear insert formed from a lattice.
Figure 31:
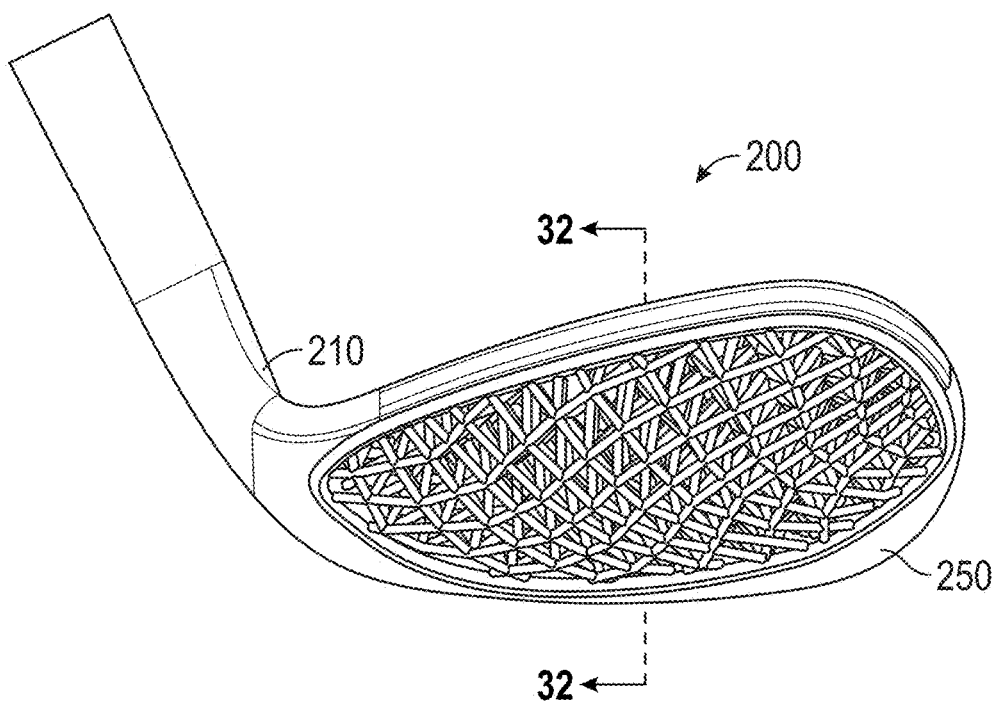
FIG. 31 is a rear perspective view of the iron head shown in FIG. 30.
Figure 32:
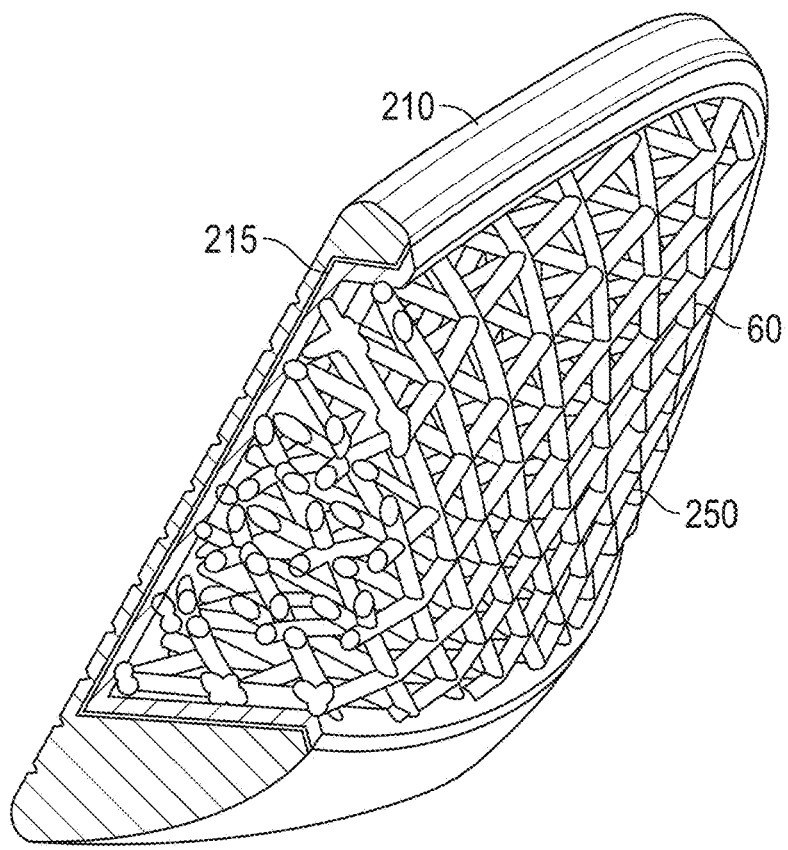
FIG. 32 is a cross-sectional view of the iron head shown in FIG. 31 taken along lines 32-32.
Figure 33:
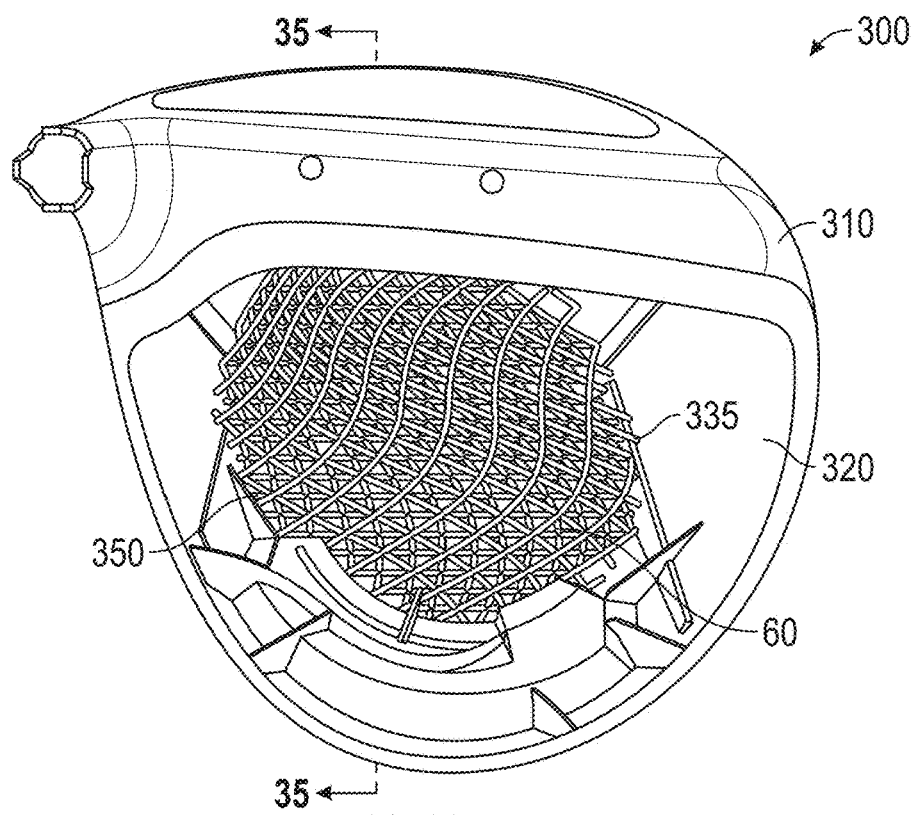
FIG. 33 is a top elevational view of a driver head with a lattice insert.
Figure 34:
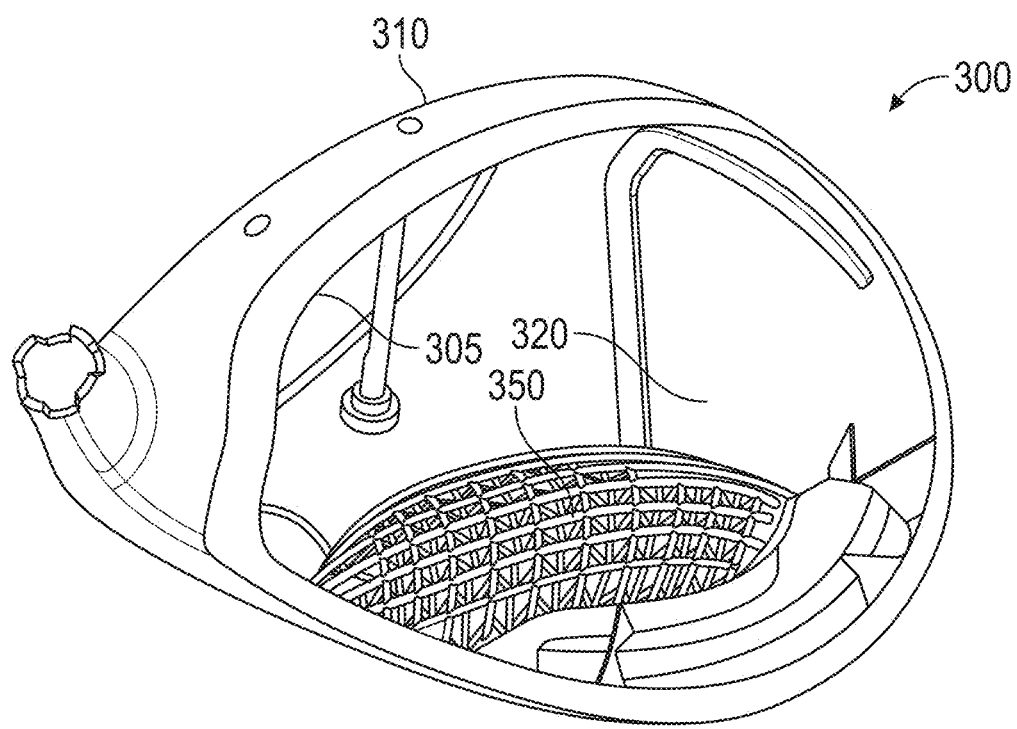
FIG. 34 is a side perspective view of the driver head shown in FIG. 33.
Figure 35:
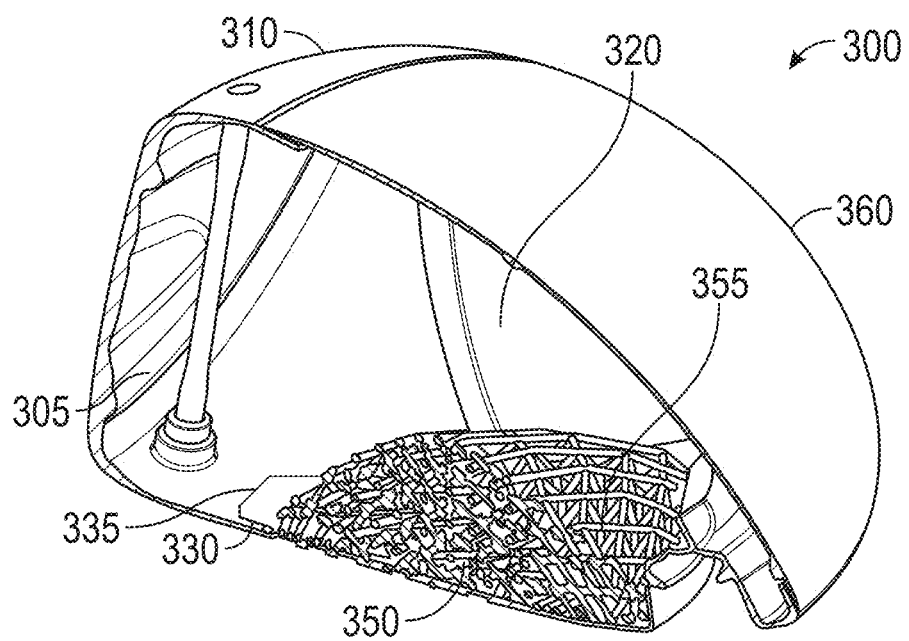
FIG. 35 is a cross-sectional view of the driver head shown in FIG. 33 taken along lines 35-35.
Figure 37:
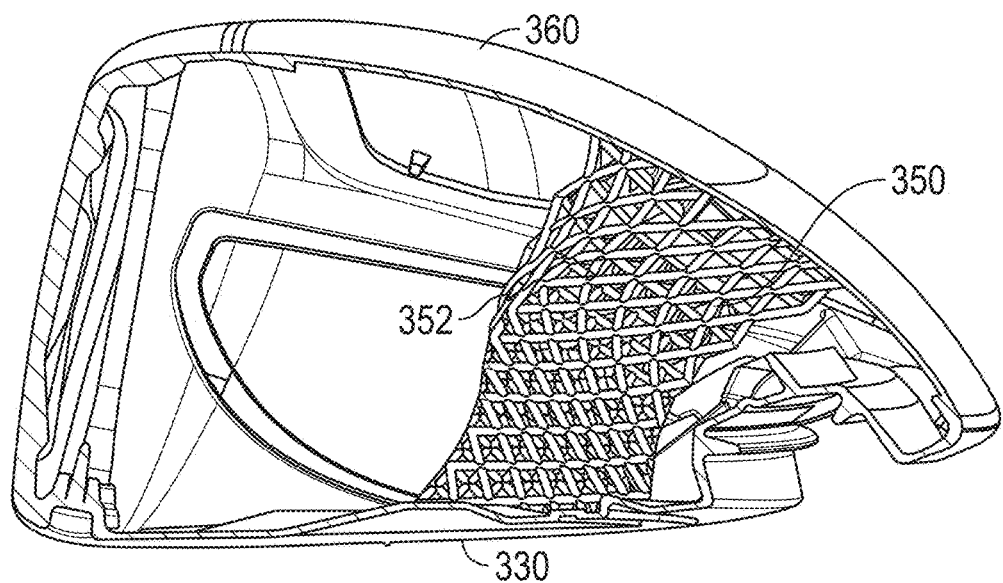
FIG. 37 is a side plan view of the embodiment shown in FIG. 36.
Figure 38:
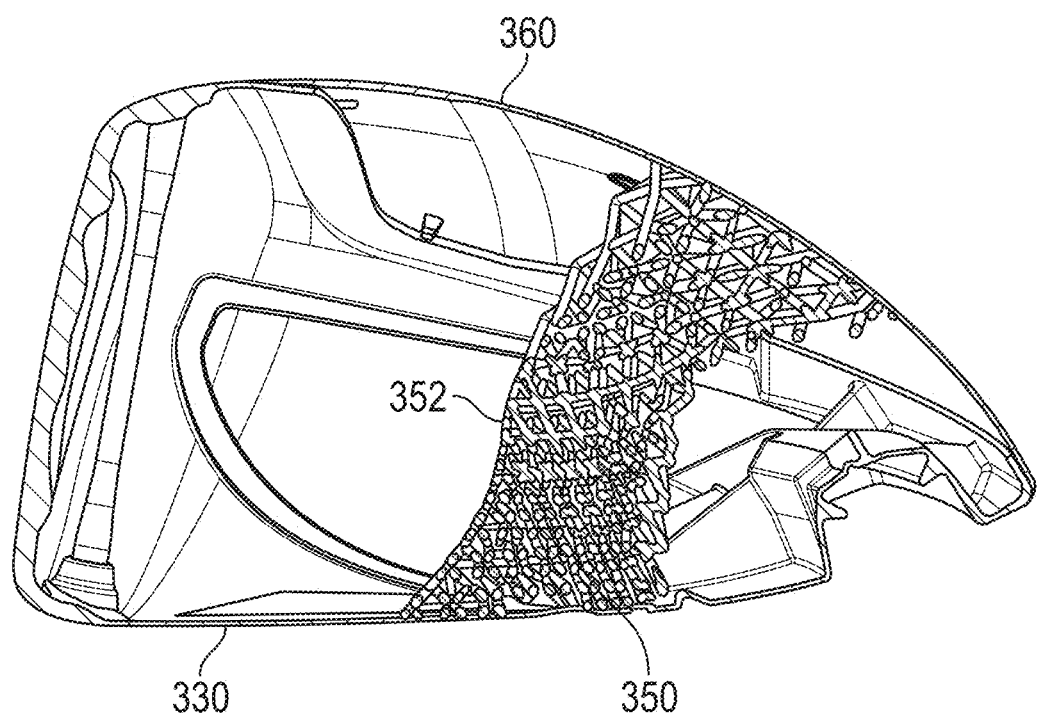
FIG. 38 is a cross-sectional view of the embodiment shown in FIG. 36 taken along lines 38-38.
Figure 39:
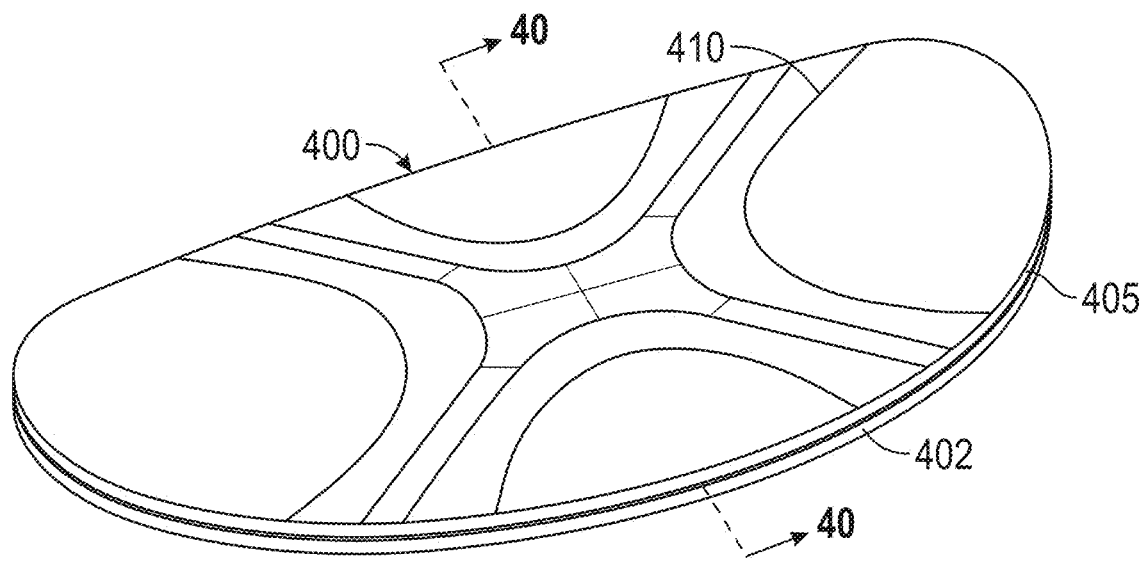
FIG. 39 is a rear perspective view of a face insert comprising a lattice.
Figure 40:
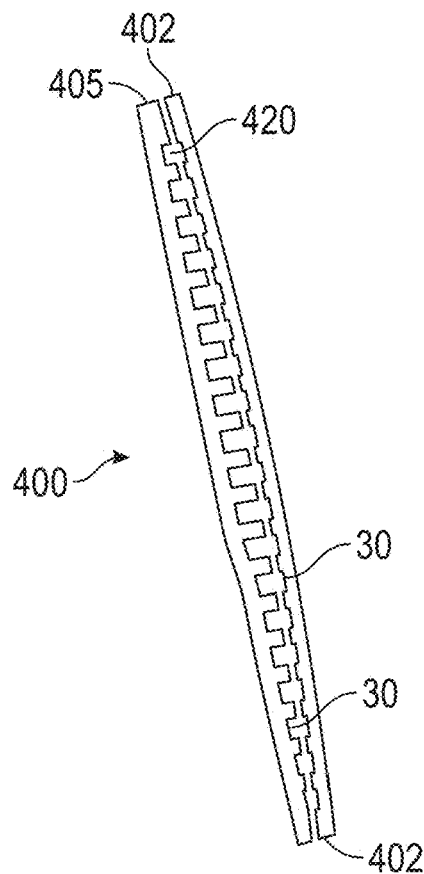
FIG. 40 is a cross-sectional view of the face insert shown in FIG. 39 taken along lines 40-40.
Figure 41:
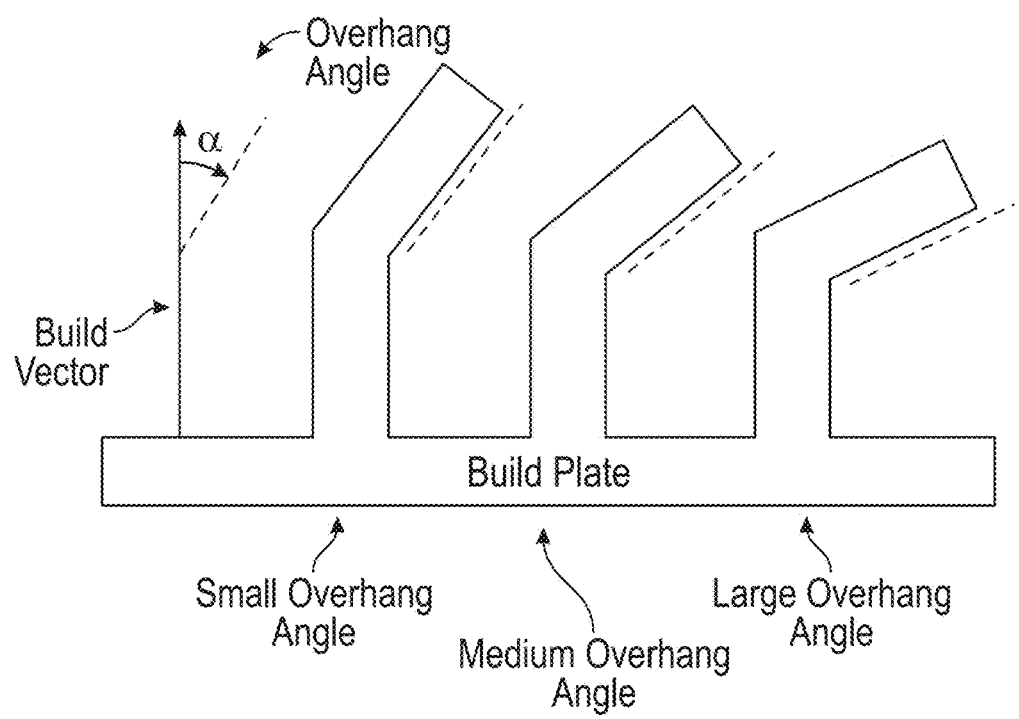
FIG. 41 is a drawing of a build plate with beams having different overhang angles.

The binder jet process 10 and photocuring processes described above permit manufacturers to take full advantage of generative design and topology optimization results, examples of which are shown in the context of putter heads 100 in FIGS. 24-29, an iron-type golf club head 200 in FIGS. 30-32, driver-type golf club heads 300 in FIGS. 33-38, and a face insert 400 with a variable thickness pattern 410 in FIGS. 39 and 40. The lattice structures 60 disclosed herein can be built into their respective golf club heads in one 3D printing step, or may be formed separately from the golf club head and then permanently affixed to the golf club head at a later time. These designs illustrate the kinds of improvements to golf club head center of gravity (CG), moment of inertia (MOI), stress, acoustics (e.g., modal frequencies), ball speed, launch angle, spin rates, forgiveness, and robustness that can be made when manufacturing constraints are removed via the use of optimization software and 3D printing.

Figure 24:
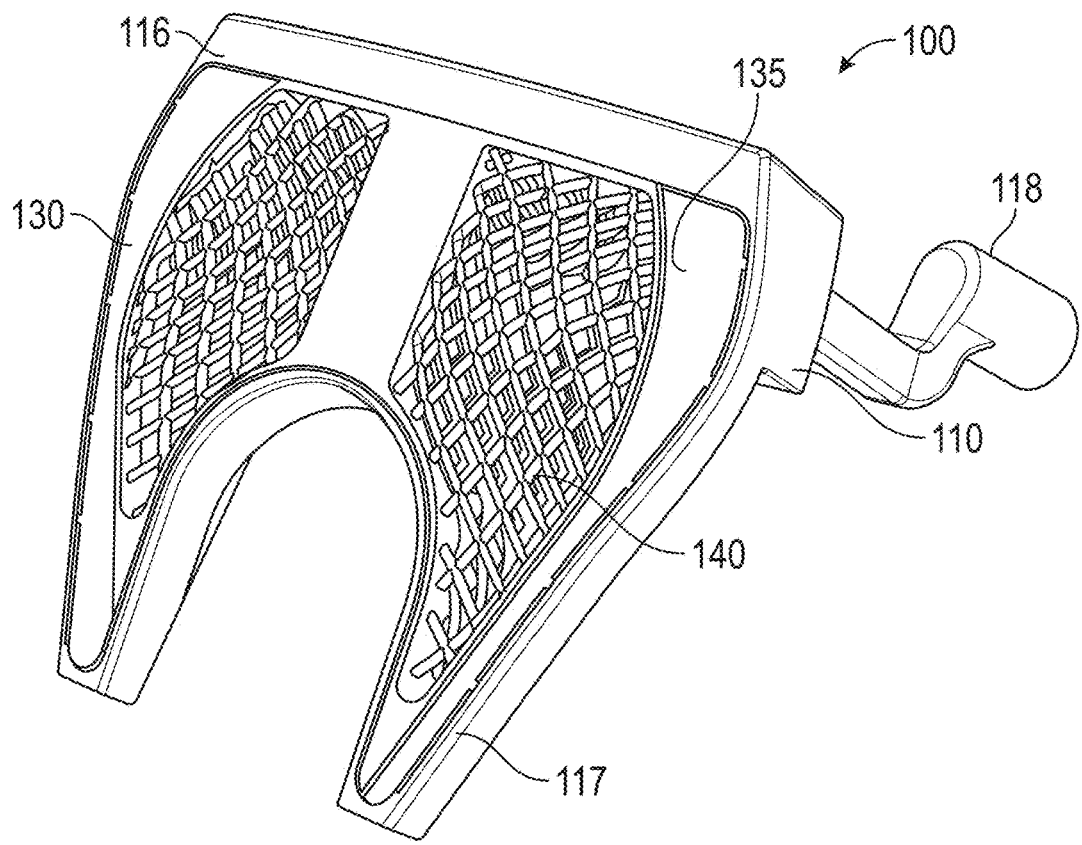
FIG. 24 is a sole perspective view of a putter head with a sole puck formed from a lattice.
Figure 25:
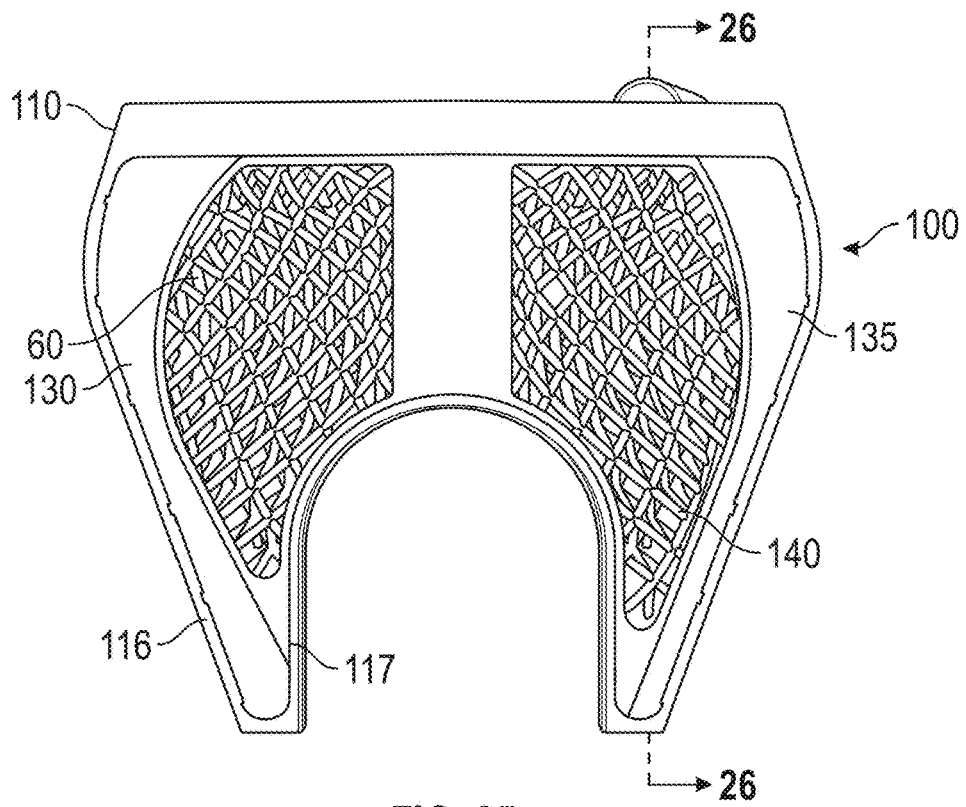
FIG. 25 is a sole plan view of the putter head shown in FIG. 24.
Figure 26:
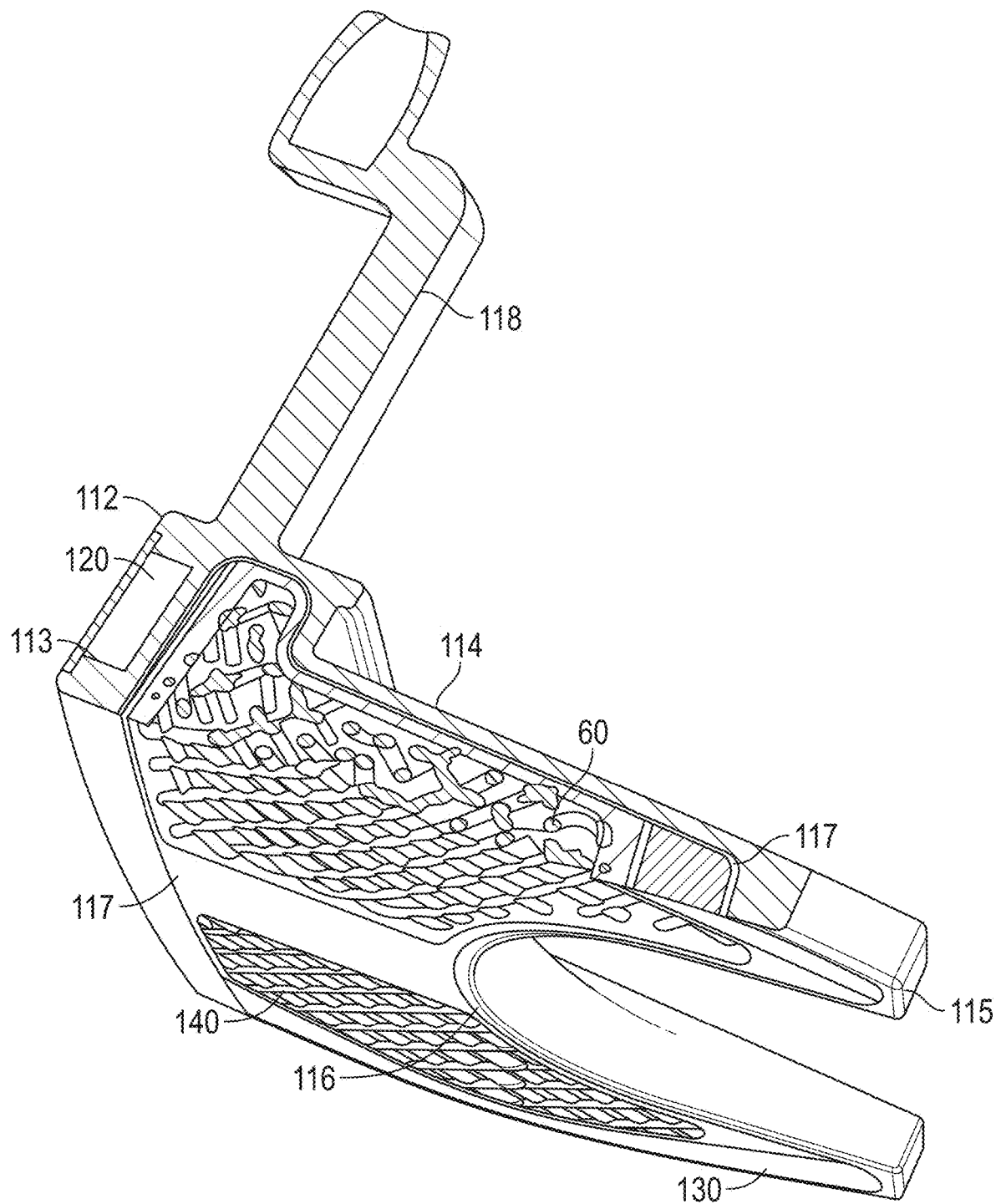
FIG. 26 is a cross-sectional view of the putter head shown in FIG. 25 taken along lines 26-26.

A preferred embodiment of the present invention is shown in FIGS. 23-25. The putter head 100 of this embodiment includes a body 110 with a face portion 112 and a face recess 113, a top portion 114, and a sole portion 116 with a sole recess 117, a face insert 120 disposed within the face recess 113, and sole weights 130, 135 and a sole insert or puck 140 affixed within the sole recess 117 so that the weights 130, 135 are disposed on heel and toe sides of the puck 140. The body 110 of the putter, and particularly the top portion 114, is formed of a metal alloy having a first density and has a body CG. The weights 130, 135 are preferably located as far as possible from the body CG and are composed of a metal alloy having a second density greater than the first density. While the hosel 118 of the embodiment shown in FIGS. 23-25 is formed integrally with the body 110, in other embodiments it may be formed separately from a different material and attached in a secondary step during manufacturing.

The puck 140 is printed using one of the binder jet and photocuring processes described above from at least one material with a third density that is lower than the first and second densities, and comprises one or more lattice structures 60 that fill the volume of the sole recess 117, freeing up discretionary mass to be used in high-density weighting at other locations on the putter head 100, preferably at the heel and toe edges and/or the rear edge 115. The materials from which the puck 140 may be printed include plastic, nylon, polycarbonate, polyetherimide, polyetheretherketone, and polyetherketoneketone. These materials can be reinforced with fibers such as carbon, fiberglass, Kevlar®, boron, and/or ultra-high-molecular-weight polyethylene, which may be continuous or long relative to the size of the part or the putter, or very short. In a preferred embodiment, the material(s) from which the puck 140 is printed is translucent or transparent so that the lattice, and at least one of the top, sole, or face portions 114, 116, 112 is made of translucent or transparent material so that the lattice structure is visible to a golfer.

Figure 27:
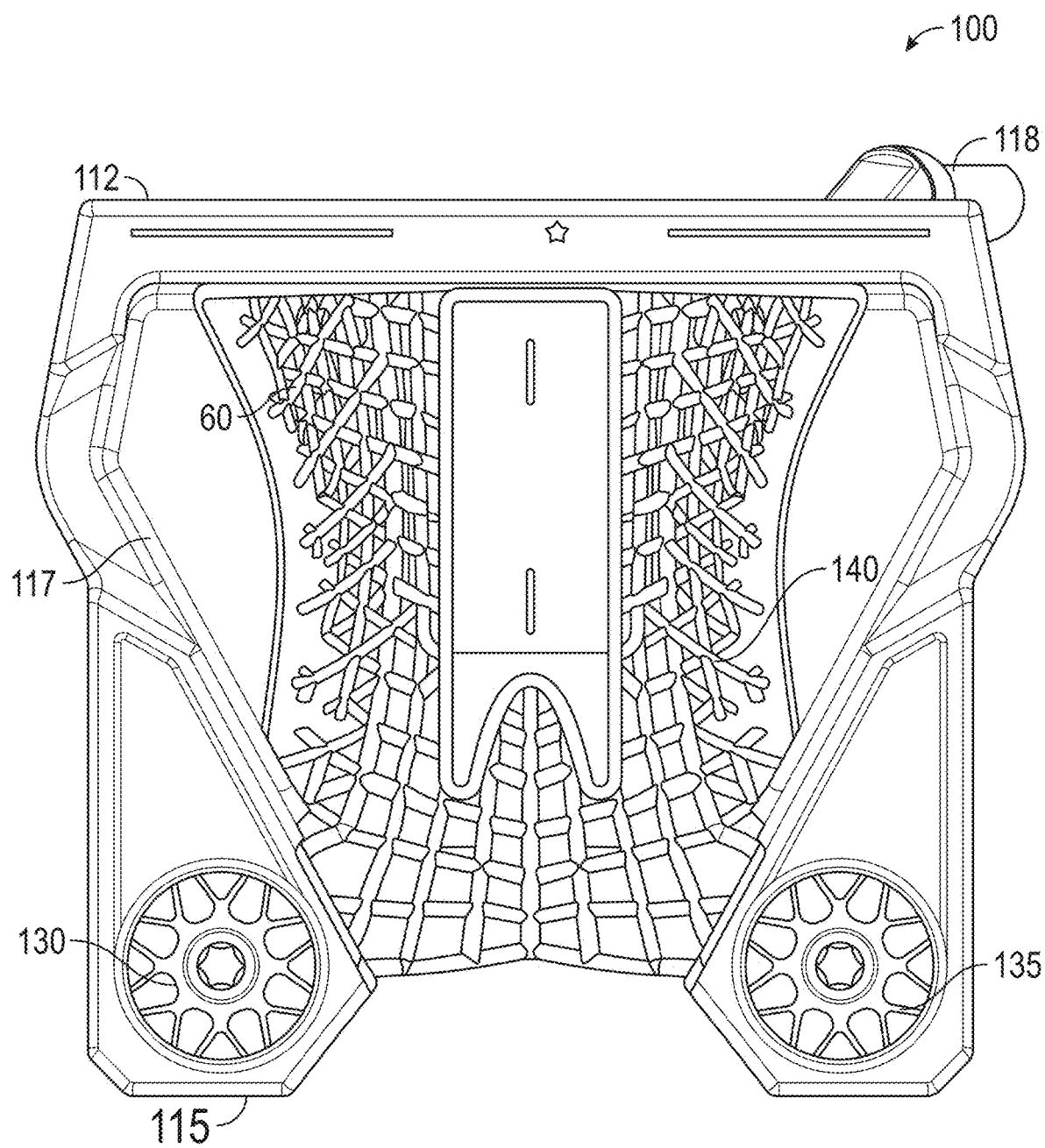
FIG. 27 is a sole plan view of another embodiment of a putter head with a sole puck formed from a lattice.

Other putter head 100 embodiments are shown in FIGS. 27-29. In these embodiments, the weights 130, 135 are threaded and are disposed at the rear edge 115 of the body, on either side and mostly behind the puck 140. In the embodiments shown in FIGS. 27 and 29, the pucks 140 have different lattice patterns 60 than the one shown in FIGS. 24-26, and do not fill the entirety of the sole recess 117. In the embodiment shown in FIG. 28, the puck 140 has another lattice pattern 60 and fills the entirety of the sole recess 117. In any of these embodiments, the puck 140 may be bonded and/or mechanically fixed to the body 110. The materials, locations, and dimensions may be customized to suit particular players.

In each of these embodiments, the weights 130, 135 preferably are made of a higher density material than the body 110, though in other embodiments, they may have an equivalent density or lower density. Moving weight away from the center improves the mass properties of the putter head 100, increasing MOI and locating the CG at a point on the putter head 100 that reduces twist at impact, reduces offline misses, and improves ball speed robustness on mishits.

Figure 36:
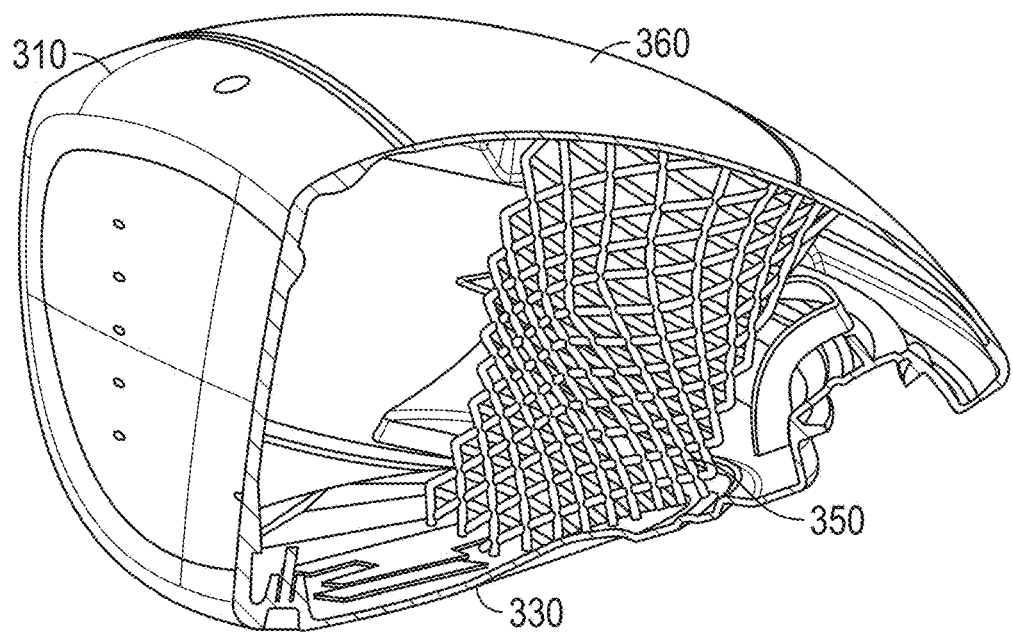
FIG. 36 is cross-sectional view of another embodiment of a driver head with a different lattice insert.

As shown in the iron club head 200 of FIGS. 30 and 31, the lattice structures 60 of the present invention can be formed into an insert 250 that entirely fills a rear cavity 215 of the iron body 210. Alternatively, as shown in the driver-type golf club heads 300 of FIGS. 33-38, the lattice insert 350 fills only a portion of the internal cavity 320. For example, in FIGS. 33-35, the lattice insert 350, which has a curved upper surface 355, contacts only an interior surface 335 of the sole 330 and is spaced from a rear face surface 305 of the body 310. As shown in FIGS. 36-38, the lattice insert 350 extends from the sole 330 to the crown insert 360, and has at least one curved surface 352.

The lattice structures disclosed herein may be utilized in more than just golf club heads and components, however. They may also be useful for providing structural and acoustic support for golf balls, golf shafts, and golf grips, and also for soft goods products like bags. The voids within the lattice structures disclosed herein may also be partially or completely filled with a filler material, which itself can be translucent or transparent to provide visibility into beams of the lattice structure. In addition, or alternatively, the lattice structure may be co-molded or overmolded with another material having different material properties to support and enhance the performance of the lattice. Similarly, the lattice structure itself, and/or any structures enveloping it, may be made from translucent or transparent material.

If the product is a golf ball, one or more of the layers may comprise a lattice, and a fill within the lattice can have different density or material properties. Similarly, the golf ball may have a core comprising lattice structures, which themselves may include fill material.

If the product is a golf club grip, it can comprise one or more lattice structures that deform in such a way to allow the grip to mold to a player's hands based upon the player's preferred hand placement and pressure gradients.

In other embodiments, the product is a golf club insert with lattice structures that allow for variable flexibility and adaptive dampening (acoustic control) of the insert, which may be a face insert, a crown insert, or a sole insert or "puck." The lattice structures fine tune the behavior of the insert and do not "activate" unless a sufficient load, or off-axis load, is placed on the insert. They may also modulate the response based on the location of impact or incident angle. In some embodiments, the lattice structures, which may be formed using additive technologies, and particularly binder jetting or photocuring resin, improve ball speed and spin robustness, and the gaps between lattice beams may be filled with a material having a different density or material properties than the lattice material.

The insert described above may be a face insert with crown and sole extensions that are affixed to the body so that they are visible to a user at address or in a golf bag. In further embodiments, the lattice may be a continuously variable mesh which allows the manufacturer to tightly control properties in each location within the insert—for example, the motion of the face-ball interface, speed, and spin—and thereby fine-tune vertical and heel-toe motion in a face insert.

An additional embodiment of the present invention is a golf product comprising a first lattice structure and a second lattice structure, each of which is printed separately from distinct materials and having distinct properties, which are then interlocked.

The products described herein, and particularly their lattice components, may be partially or fully electroplated, thereby improving the stiffness and aesthetics of the affected piece.

Excess Powder Removal

The increased design freedom provided by binder jetting allows for the creation of fully enclosed void volumes with a few, small vent holes for powder removal, which can later be plugged (if needed) via spot weld, threaded fastener, cap, cover, medallion, adhesive, or other means known to a person skilled in the art. The absence of metal support structures allows hollow structures like a typical driver head or fairway wood to be printed with only small vent holes for powder removal. Removal of powder reduces the overall mass of printed golf club head components and improves their structural integrity.

Each of the designs disclosed herein have a plurality of openings that permit removal of excess printing material. Another example of a golf club component with such holes is shown in FIGS. 39 and 40 with reference to a binder jet printed face insert 400 having a variable thickness pattern 410. This face insert 400 has a plurality of port holes 402 encircling the insert 400 along its outer edge 405, also known as the weld joint. The port holes 402 extend from the outer edge 405 and connect with central voids 420 where excess powder 30 is trapped after the sintering process is complete. The greater the surface area of the part, in this case the face insert 400, the greater number of port holes 420 are required to efficiently remove the excess powder 30.

Once excess powder 30 is removed from the face insert 400, preferably via shaking and polishing steps, the insert 400 can be welded into a golf club head 300 to ensure that the resulting final product does not violate any USGA rules against open holes. The port holes 402 preferably are placed in strategic locations on the face insert 400 or other parts of the golf club heads such that they fall within a weld zone, a bonding zone, under a medallion, and/or in a brazing zone. In other words, the port holes 402 are located in a region on the part where a secondary process will cover them up. This allows for the excess powder 30 to be evacuated in the raw state, and then for the port hole 402 to be covered once the raw part is made into a golf club head 300.

Entire heads, or head components, can be printed and assembled using the methods disclosed herein from materials such as steel, titanium, carbon fiber composites, and other structural materials. If golf club components are printed as disclosed herein, they can be attached to traditionally manufactured components via welding, bonding, brazing, soldering, and/or other techniques known in the art. The methods of the present invention are applicable to any type of club head, including putters, wedges, irons, hybrids, fairway woods, and drivers.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:
1. A golf club product comprising:
an external surface; and
a support structure consisting of a complex surface-based structure selected from the group consisting of TPMS and gyroids;
wherein the support structure is partially bounded by the external surface,
wherein the golf product is a golf club grip, and
wherein the golf product is manufactured using a method selected from the group consisting of digital light synthesis, digital light processing, and stereolithography.
2. The golf product of claim 1, wherein at least a portion of the golf product is electroplated.
3. The golf product of claim 1, wherein the golf product is a golf club grip, and wherein the lattice support structure compresses when pressure is applied to it.
4. The golf product of claim 3, wherein the lattice support structure comprises cells of varying size and shape.
5. The golf product of claim 1, wherein at least one of the support structure and the external surface is transparent or translucent.

6. A golf product comprising:
an external surface; and
a lattice support structure,
wherein the lattice support structure is completely enclosed by the external surface,
wherein the golf product is selected from the group consisting of a golf club head component, a golf club head, a golf ball, a golf club shaft, and a golf club grip,
wherein the lattice support structure is composed of a first material with a first density,
wherein at least a portion of the lattice support structure is filled with a second material with a second density that is different from the first density, and
wherein the golf product is manufactured using a method selected from the group consisting of digital light synthesis, digital light processing, and stereolithography.
7. The golf product of claim 6, wherein at least one of the lattice support structure and the external surface is transparent or translucent.
8. The golf product of claim 7, wherein the lattice support structure is co-molded with another material, and wherein the lattice structure comprises an overmolding layer.
9. The golf product of claim 6, wherein the lattice support structure provides acoustic damping.
10. The golf product of claim 6, wherein the lattice support structure is a continuously variable mesh.
11. The golf product of claim 6, wherein at least a portion of the golf product is electroplated.

* * * * *